US010895744B2

(12) United States Patent
Sugiyama et al.

(10) Patent No.: US 10,895,744 B2
(45) Date of Patent: Jan. 19, 2021

(54) HEAD-UP DISPLAY APPARATUS AND IMAGE DISPLAY APPARATUS THEREOF

(71) Applicant: MAXELL, LTD., Kyoto (JP)

(72) Inventors: Toshinori Sugiyama, Kyoto (JP); Koji Hirata, Kyoto (JP); Yasuhiko Kunii, Kyoto (JP); Masahiko Yatsu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/323,793

(22) PCT Filed: Mar. 28, 2017

(86) PCT No.: PCT/JP2017/012662
§ 371 (c)(1),
(2) Date: Feb. 7, 2019

(87) PCT Pub. No.: WO2018/029892
PCT Pub. Date: Feb. 15, 2018

(65) Prior Publication Data
US 2019/0212560 A1 Jul. 11, 2019

(30) Foreign Application Priority Data
Aug. 8, 2016 (JP) .................................. 2016-155563

(51) Int. Cl.
*G02B 27/01* (2006.01)
*G02B 6/00* (2006.01)
(Continued)

(52) U.S. Cl.
CPC .......... *G02B 27/0149* (2013.01); *B60K 35/00* (2013.01); *G02B 5/045* (2013.01);
(Continued)

(58) Field of Classification Search
CPC ............ G02B 27/0149; G02B 27/0101; G02B 5/045; G02B 6/00; G02B 6/002;
(Continued)

(56) References Cited

U.S. PATENT DOCUMENTS

2006/0164839 A1* 7/2006 Stefanov ............... F21S 43/239
362/327
2013/0057832 A1* 3/2013 Akiyama ........... G02B 27/0944
353/20

(Continued)

FOREIGN PATENT DOCUMENTS

JP   11-224518 A   8/1999
JP   2001-067919 A   3/2001
(Continued)

OTHER PUBLICATIONS

International Search Report of PCT/JP2017/012662 dated Jun. 13, 2017.

*Primary Examiner* — Isiaka O Akanbi
*Assistant Examiner* — Nathaniel J Lee
(74) *Attorney, Agent, or Firm* — Mattingly & Malur, PC

(57) ABSTRACT

A HUD system and light source apparatus can be manufactured with miniaturization at low cost. A head-up display apparatus includes: an image display apparatus generating image light to be projected; an optical system performing predetermined correction to the image light emitted from the image display apparatus; and a concave mirror reflecting the image light corrected by the optical system to project it onto a windshield or combiner. The image display apparatus includes: a solid light source; a collimating optical system converting, into parallel light, the light from the solid light source; a lighting optical system configured by an optical member that polarizes a direction of a light beam generated by the collimating optical system and simultaneously expands a width of the light beam; and a display apparatus, (Continued)

the image display apparatus being configured to be arranged across and opposite the optical system on an optical axis of the concave mirror.

11 Claims, 23 Drawing Sheets

(51) Int. Cl.
| | |
|---|---|
| *G02B 19/00* | (2006.01) |
| *B60K 35/00* | (2006.01) |
| *G02B 5/04* | (2006.01) |
| *F21V 8/00* | (2006.01) |
| *G09G 3/34* | (2006.01) |

(52) U.S. Cl.
CPC ............... *G02B 6/00* (2013.01); *G02B 6/002* (2013.01); *G02B 6/003* (2013.01); *G02B 6/0023* (2013.01); *G02B 6/0025* (2013.01); *G02B 6/0048* (2013.01); *G02B 6/0068* (2013.01); *G02B 19/0028* (2013.01); *G02B 19/0061* (2013.01); *G02B 27/0101* (2013.01); *G02B 2027/015* (2013.01); *G02B 2027/0154* (2013.01); *G09G 3/3426* (2013.01); *G09G 2380/10* (2013.01)

(58) Field of Classification Search
CPC .. G02B 6/0023; G02B 6/0025; G02B 6/0056; G02B 6/0048; G02B 6/0068; G02B 19/0028; G02B 19/0061; G02F 1/1336; B60K 35/00
See application file for complete search history.

(56) References Cited

U.S. PATENT DOCUMENTS

| | | | |
|---|---|---|---|
| 2013/0162932 A1* | 6/2013 | Han | ...................... G02B 6/0058 |
| | | | 349/65 |
| 2014/0253849 A1 | 9/2014 | Poon et al. | |
| 2016/0139408 A1* | 5/2016 | Yagi | .................... G02B 27/0101 |
| | | | 359/633 |
| 2016/0266383 A1 | 9/2016 | Liu | |
| 2016/0299341 A1 | 10/2016 | Yoshida et al. | |
| 2018/0101063 A1* | 4/2018 | Chang | ............... G02F 1/133603 |

FOREIGN PATENT DOCUMENTS

| | | |
|---|---|---|
| JP | 2003-066369 A | 3/2003 |
| JP | 2005-032579 A | 2/2005 |
| JP | 2006-267715 A | 10/2006 |
| JP | 2006-285043 A | 10/2006 |
| JP | 2007-065408 A | 3/2007 |
| JP | 2009-252380 A | 10/2009 |
| JP | 2011-150264 A | 8/2011 |
| JP | 2014-191321 A | 10/2014 |
| JP | 2015-502565 A | 1/2015 |
| JP | 2015-090442 A | 5/2015 |
| JP | 2015-118272 A | 6/2015 |
| JP | 2016-095436 A | 5/2016 |

* cited by examiner (a)

(b)

(a)

(b)

(a)

(b)

(c)

(d)

(a)

(b)

COMPARATIVE EXAMPLE (a)

(b)

(a)

(b)

(a)

161

(b)

(a)

(b)

(a)

(b)

(a)

(b)

(a)

(b)

HEAD-UP DISPLAY APPARATUS AND IMAGE DISPLAY APPARATUS THEREOF

TECHNICAL FIELD

The present invention relates to a technique of a head-up display (hereinafter "HUD") for: projecting an image(s) onto a windshield of a vehicle or onto a combiner as a transparent or translucent, plate-shaped display member provided immediately before the windshield; and displaying information to a driver by a virtual image(s). Particularly, the present invention relates to a usable, downsized, highly-efficient image display apparatus as a light source module generating plane image light in the HUD.

BACKGROUND ART

The image display apparatus in a HUD apparatus, which generates the image light to be projected onto the vehicle's windshield or combiner for generating the virtual image, is generally incorporated in a narrow space called a dashboard of the vehicle, and so a new image display apparatus downsized with high efficiency is desired.

Incidentally, for example, Japanese Patent application Laid-Open No. 2015-90442 (Patent Document 1) as a technique related to such a HUD discloses a display apparatus that includes a device for displaying an image(s) and a projection optical system for projecting the image displayed on the display device, and that makes screen distortion on the entire viewpoint area of an observer small and realizes miniaturization. Incidentally, the projection optical system of this conventional technique has a first mirror and a second mirror in order of the observer's optical path from the display device. Then, Patent Document 1 discloses that miniaturization of a HUD apparatus is realized by having such a configuration that a relationship among an incident angle of the first mirror to a long-axis direction of an image, an incident angle of the first mirror to a short-axis direction of the image, an interval between an image display screen of the display device and the first mirror, and a horizontal width of a virtual image virtually recognized by the observer complies with a predetermined relationship(s).

RELATED ART DOCUMENTS

Patent Documents

Patent Document 1: Japanese Patent Application Laid-open No. 2015-90442

SUMMARY OF THE INVENTION

Problems to be Solved by the Invention

Recently, use of a LED (Light Emitting Diode) as a light emitting source is effective with improvement of light emitting efficiency of a LED as a solid light source. However, miniaturization and/or modularization of an apparatus have not yet been insufficient in the optical-system form disclosed in the above-mentioned conventional technique (Patent Document 1), which uses a LED collimator for converting the LED and its light to substantially parallel light.

Therefore, the present invention has objects of: providing a downsized, highly-efficient image display apparatus preferably usable as a light source module that configures a HUD apparatus and generates plane image light; and further using the image display apparatus to provide a HUD apparatus suitable for its incorporation into a narrow space called a dashboard of a vehicle and for its maintenance.

Means for Solving the Problems

As one aspect for attaining the above purpose, the present invention provides a head-up display apparatus projecting image light onto a windshield of a vehicle or a combiner provided just before the windshield to provide an image to a driver by a virtual image obtained from reflected light of the image light, the head-up display apparatus including: an image display apparatus generating the image light to be projected; an optical system performing predetermined correction to the image light generated from the image display apparatus; and a concave mirror reflecting the image light corrected by the optical system to project it onto the windshield or combiner, in which the image display apparatus includes: a solid light source; a collimating optical system converting, into substantially parallel light, light from the solid light source; a lighting optical system composed of an optical member, the optical member polarizing a direction of a light beam generated by the collimating optical system and simultaneously expanding a width of the light beam; and a display apparatus, and the image display apparatus is arranged across and opposite the optical system on an optical axis of the concave mirror.

Effects of the Invention

The present invention makes it possible to realize the image display apparatus, which is downsized with high efficiency and can be manufactured at low cost, and to provide, by using the image display apparatus, the HUD apparatus easily capable of its incorporation into the narrow space such as a dashboard and its maintenance.

BRIEF DESCRIPTIONS OF THE DRAWINGS

DETAILED DESCRIPTION OF PREFERRED EMBODIMENTS

Figure 1:
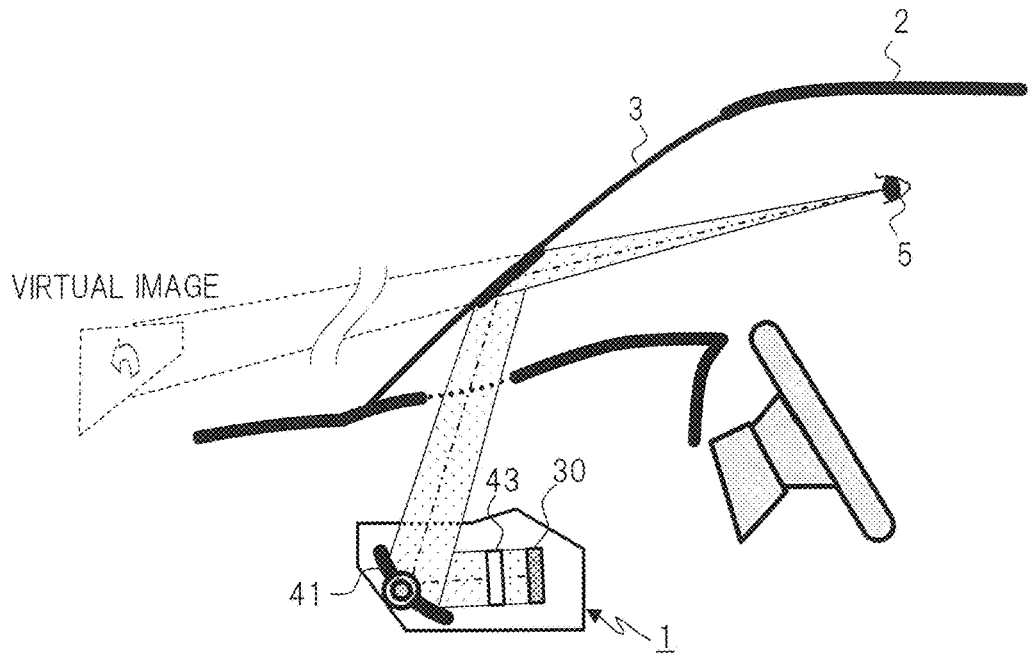
FIG. 1 is a view showing the entire appearance of a head-up display (HUD) apparatus according to a first embodiment of the present invention.
Figure 1:
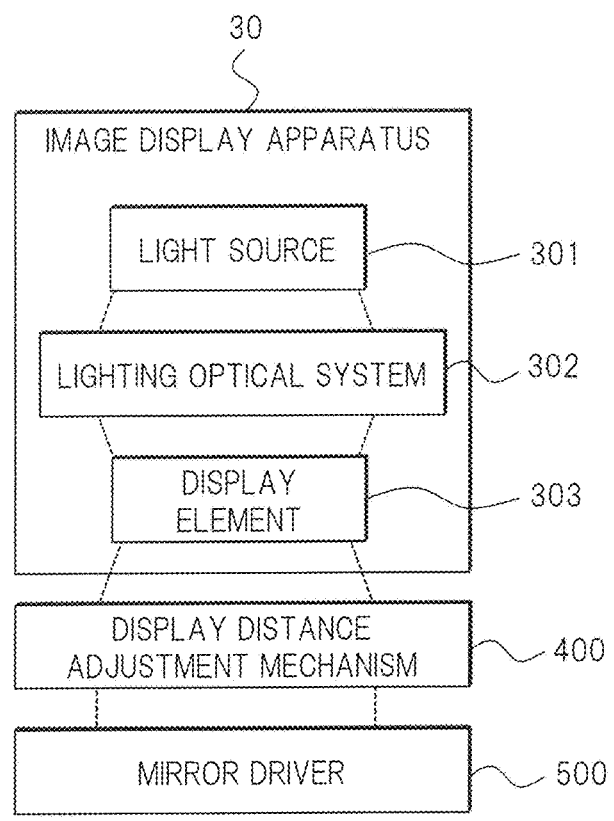

Hereinafter, embodiments of the present invention will be described in detail with reference to the accompanying drawings. Note that components having the same function are denoted by the same reference characters throughout the drawings for describing the embodiments, and the repetitive description thereof will be omitted. Meanwhile, parts described with reference numerals in a certain drawing may be referred to by attaching the same reference numerals although not shown again in the descriptions of the other drawings.

FIG. 1(a) is a view showing an outline about an example of a motion concept of a head-up display (HUD) apparatus using an image display apparatus according to an embodiment of the present invention. A HUD apparatus 1 according to the embodiment of the present invention causes a concave mirror 41 to reflect, via an optical system 43 such as a correction lens, image light emitted by an image display apparatus 30 placed in its housing and to project it onto a windshield 3 of a vehicle 2 or a combiner (not shown) provided immediately before the windshield. The image light reflected by the windshield 3 is incident on a viewpoint of a driver 5 as shown in FIG. 1(a). This makes it possible for the driver 5 to view the image light projected onto and reflected from the windshield 3, and visually recognize an image(s) as a virtual image(s) ahead of the windshield.

Incidentally, particularly, the image display apparatus 30 in such a HUD apparatus 1 generally has an internal configuration as shown also in FIG. 1(b). Here, the image display apparatus 30 indicates a case of a projector. The image display apparatus 30 includes respective units such as a light source 301, a lighting optical system 302, and a display element 303. More specifically, illumination light generated by the light source 301 is converged and uniformized (equalized) by the lighting optical system 302, and is irradiated to the display element 303. This light includes the display element 303 which is an element for forming a projected image(s) on its display surface and generating projected light.

It will be apparent to those skilled in the art that the light emitted from the image display apparatus 30 is further projected onto the windshield 3 of the vehicle 2 via a display distance adjustment mechanism 400 and a mirror driver 500. Also, adjustment of an angle of the concave mirror 41 may makes a display position of the virtual image viewed by the driver 5 adjustable upward and downward by adjusting a position of projecting the image onto the windshield 3. Incidentally, content to be displayed as the virtual image is not particularly limited and, for example, vehicle information, navigation information, an image of a front scenery photographed with a not-shown camera image (surveillance camera or all-around view), or the like can be appropriately displayed.

Figure 2:
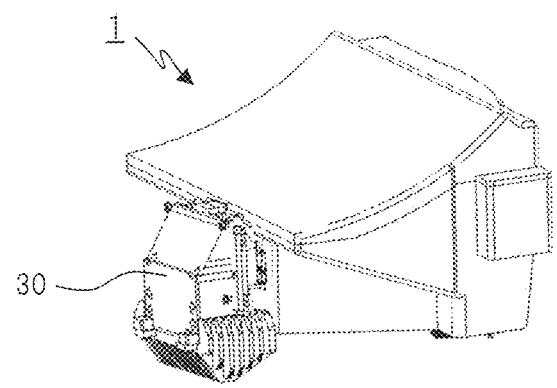
FIG. 2 is a view showing an appearance of an image display apparatus and its internal configuration in the HUD apparatus according to the first embodiment.
Figure 2:
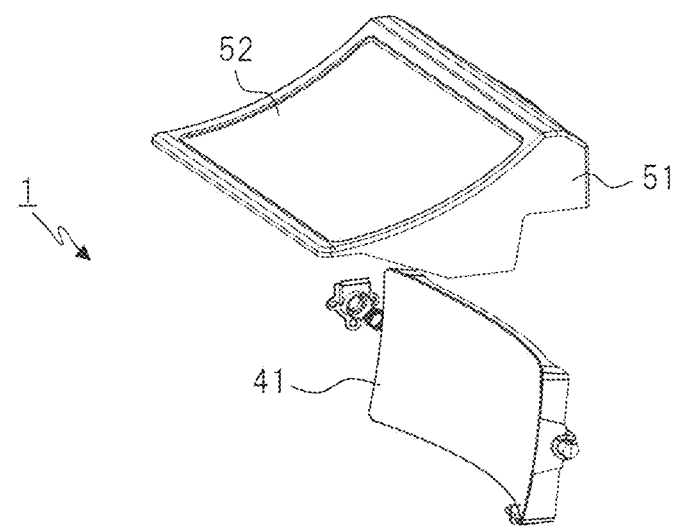
Figure 2:
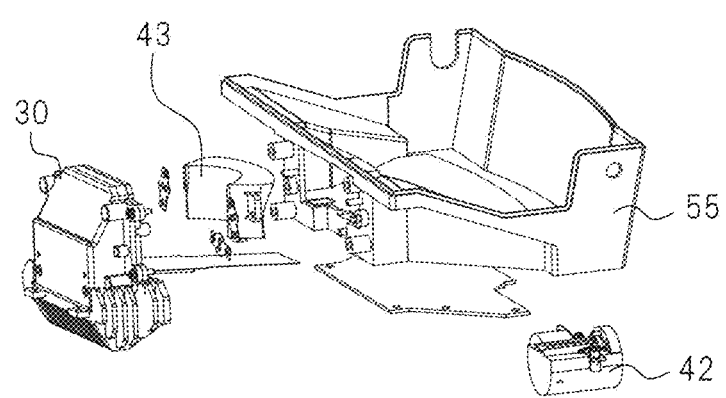

FIG. 2(a) is a perspective view showing an external appearance of the HUD apparatus 1, and FIG. 2(b) is a developed perspective view showing each of its components with them disassembled. As is apparent also from these drawings, the image display apparatus 30 configuring the HUD apparatus 1 is generally accommodated inside an exterior case 55 serving as its housing together with the concave mirror 41 and a distortion correction lens 43. Then, formed on an upper surface of the exterior case 55 is an opening through which image light is projected toward the windshield. The opening is covered with an anti-glare plate 54 (glare trap). Additionally, reference numeral 42 in FIG. 2 denotes a concave-mirror driver composed of an electric motor or the like for adjusting a position of the above concave mirror 41.

Subsequently, the image display apparatus 30 constituting the above-described HUD apparatus 1 will be detailed below with reference to FIG. 3. The image display apparatus 30 is configured by accommodating an LED, a collimator, a composite diffusion block, and a light guide, etc., which are detailed later, inside a light-source apparatus case 11 formed of, for example, plastic or the like. A liquid crystal display element 50 (corresponding to the display element 303 in FIG. 1) is attached to an upper surface of the light-source apparatus case. An LED (Light Emitting Diode) element serving as a semiconductor light source and an LED substrate 12 mounting a control circuit of the LED element are attached to one side surface of the light-source apparatus case. Further, a heatsink 13 for cooling heat generated by the above LED element and control circuit is attached to an outside surface of the LED substrate 12.

Incidentally, as is apparent also from the above explanation, the condition where the HUD apparatus is incorporated into the narrow space called the dashboard of the vehicle will make it apparent for the image display apparatus 30 in the HUD apparatus 1 to require preferably being usable by modularization and being miniaturized with high efficiency.

First Embodiment

Figure 3:
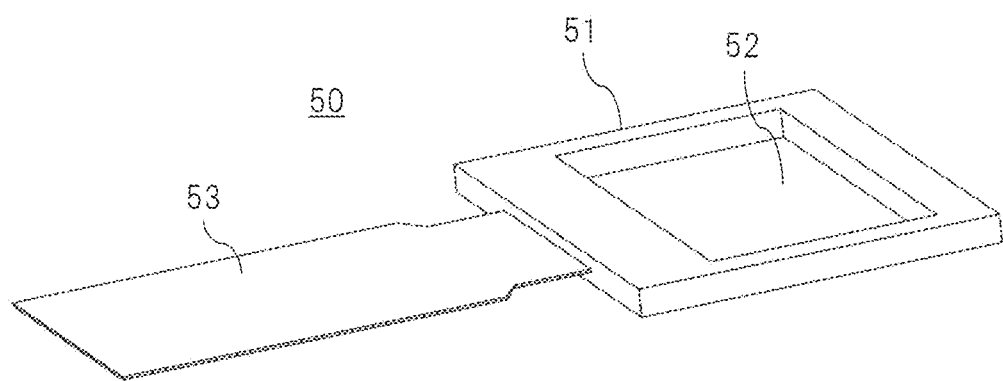
FIG. 3 is a view showing an appearance of a light source apparatus in the image display apparatus according to the first embodiment.
Figure 3:
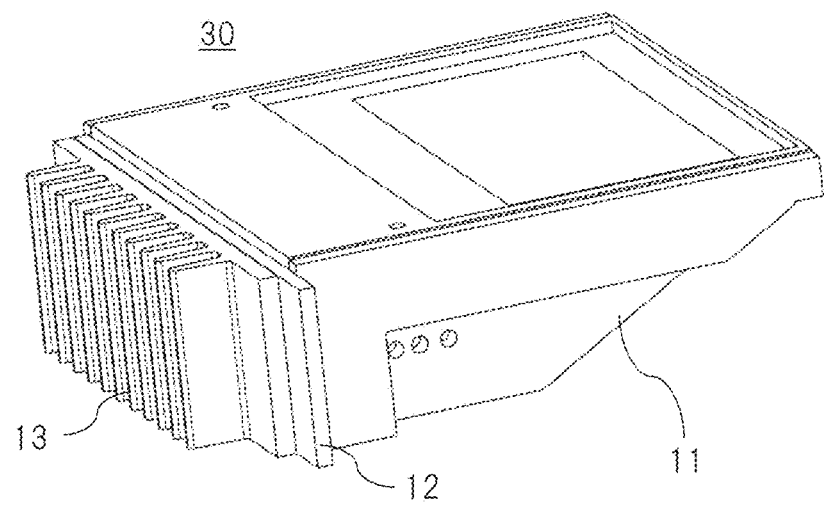

FIG. 3 is a developed perspective view showing an appearance of an image display apparatus configuring a HUD apparatus according to a first embodiment of the present invention. As is apparent also from FIG. 3, the image display apparatus (main body) 30 is formed of, for example, plastic or the like, and is configured from a light-source apparatus case 11 that accommodates therein an LED, a collimator, a composite diffusion block, and a light guide, etc. detailed later. Also, a liquid crystal display element 50 is attached to an upper surface of the light-source apparatus case. Further, a LED (Light Emitting Diode) element serving as a solid light source and an LED substrate 12 mounting a control circuit of the LED element are attached to one side surface of the light-source apparatus case. Concurrently therewith, a heatsink 13 for cooling heat generated by the above LED element and control circuit is attached to an outside surface of the LED substrate 12.

Further, the liquid crystal display element 50 attached to the upper surface of the light-source apparatus case 11 is configured by a liquid crystal display panel frame 51, a liquid crystal display panel 52 attached to the frame, and a FPC (flexible wiring substrate) 53 electrically connected to the panel. That is, although detailed later, the liquid crystal display panel 52 controls image light etc. to be displayed thereon by control signals from the LED element serving as a solid light source and from the control circuit (not shown in this case) configuring the HUD apparatus.

Figure 4:
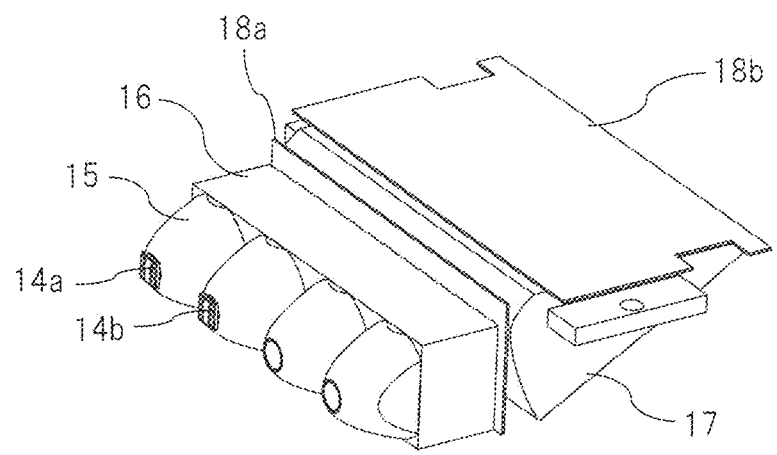
FIG. 4 is a view showing an internal configuration of the light source apparatus in the image display apparatus according to the first embodiment.

FIG. 4 shows a configuration of an optical system that is a portion of the internal configuration of the above image display apparatus 30, namely, a configuration of an optical system accommodated in the light-source apparatus case 11. That is, a plurality (four in this embodiment) of LEDs 14a and 14b (only two are shown in this case) configuring the light source are attached to the LED collimator 15 at predetermined positions.

<LED Collimator>

Figure 5:
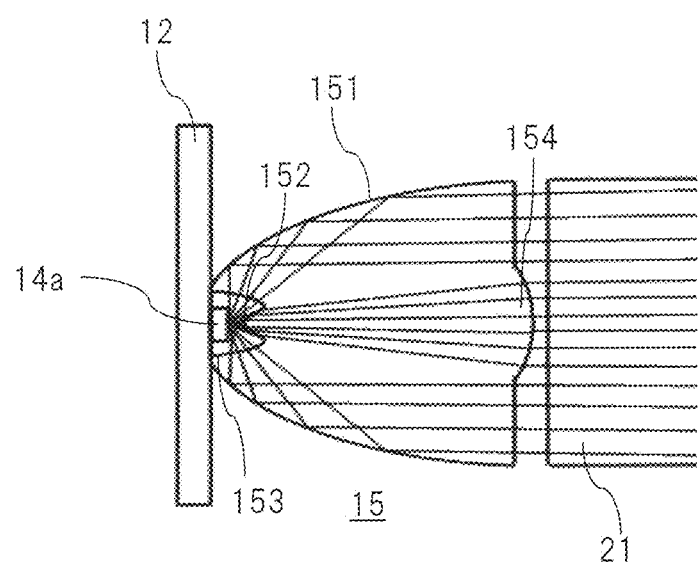
FIG. 5 is a diagram for explaining details of a collimator in the image display apparatus according to the first embodiment.

Incidentally, each of the LED collimators 15 is formed of, for example, a translucent resin such as acrylic and, as shown also in FIG. 5, has a conic, convex, outer peripheral surface 151 obtained by rotating a substantially parabolic disconnection and has at its top portion a concave portion 153 that forms a convex portion (i.e., a convex lens surface) 152 at its center portion. Further, the LED collimator 15 has at a center portion of its planar portion a convex lens surface (or a concave lens surface recessed inward) 154 projecting to outside. On the other hand, the LEDs 14a and 14b are disposed at predetermined positions on a surface of the so-called LED substrate 12 which is their circuit substrate. Incidentally, a paraboloid forming the conical, outer peripheral surface of the LED collimator 15 is set or forms a reflection surface within a range of an angle within which light emitted in a peripheral direction from the LED 14a can be totally reflected inside the paraboloid. Incidentally, a material for forming the LED collimator is not limited to acrylic as mentioned above, and any material may be used as long as being a transparent material. A polycarbonate, cycloolefin-based polymer, or silicone-based polymer material, glass, and the like are preferable as a higher heat-resistance material when power of the LED is large particularly.

The above LED substrate 12 is arranged on and fixed to the LED collimator 15 so that the LEDs 14a and 14b on a surface of the LED collimator are positioned at central portions of their concave portions 153 as shown also in FIG. 5. The above LED collimator 15 having such a configuration: converges, by two convex lens surfaces 152, 154 forming an outer shape of the LED collimator 15, some light beams particularly radiated upward (in a right direction of FIG. 5) from a center portion of the LED collimator among light beams radiated from the LED 14a, thereby making themparallel; and reflect, by the paraboloid forming the conical, outer peripheral surface of the LED collimator 15, light beams radiated circumferentially from the other portion of the LED and similarly converges them, thereby making them parallel. In other words, the LED collimator 15, whose center portion the convex lens is formed at and whose peripheral portion the paraboloid is formed at, makes it possible to take out, as a light beam(s) approximating to parallel light, substantially all of light beams generated by the LED 14a, and to improve use efficiency of the generated light beams.

Incidentally, a rectangular composite diffusion block 16 is provided on a light emission side of the LED collimator 15. That is, the light emitted from the LED 14a or 14b becomes parallel light by an action of the LED collimator 15, and is incident on the composite diffusion block 16.

Here, returning to FIG. 4 again, a light guide 17 having a substantially triangular cross-section is provided via a first diffuser 18a on an emission surface side of the above composite diffusion block 16, and a second diffuser 18b is attached to an upper surface of the light guide. This causes horizontal light of the above LED collimator 15 to be reflected upward in FIG. 4 by an action (workings) of the light guide 17, and causes a longitudinal width of a light beam (flux) of the horizontal light to be expanded by the workings of the light guide 17 and guided to an incident surface of the above liquid crystal display element 50. Those workings of the light guide 17 make it possible to realize a thin, downsized (compact) image display apparatus. Incidentally, at this time, an intensity of the light is made uniform by the above first and second diffusers 18a, 18b.

<Detailed Structure of Light Guide>

Subsequently, the light guide 17 constituting the above light source apparatus will be detailed below with reference to FIG. 6. Incidentally, FIG. 6(a) is a perspective view showing the entire light guide 17, FIG. 6(b) is its cross-sectional view, and FIGS. 6(c) and 6(d) are partially enlarged cross-sectional views each showing details of the cross-section.

Figure 6:
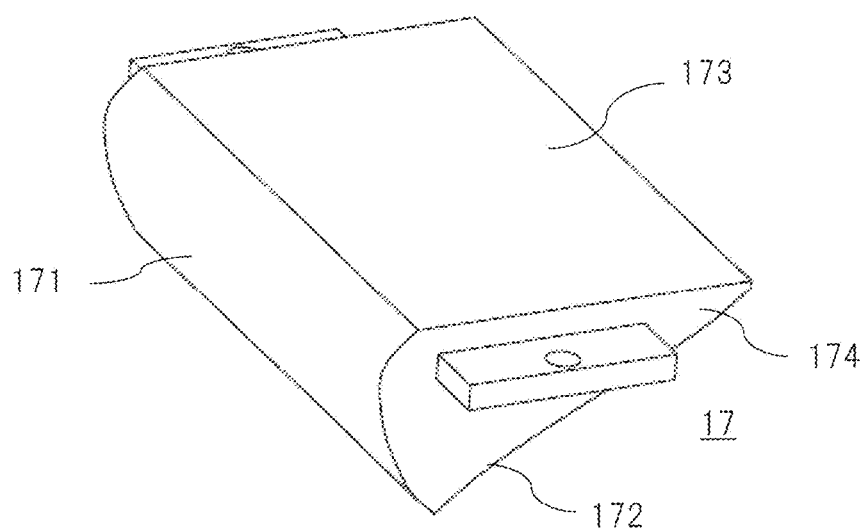
FIG. 6 is a perspective view, a cross-sectional view, and an enlarged cross-sectional view each showing a detailed shape of a light guide in the image display apparatus according to the first embodiment.
Figure 6:
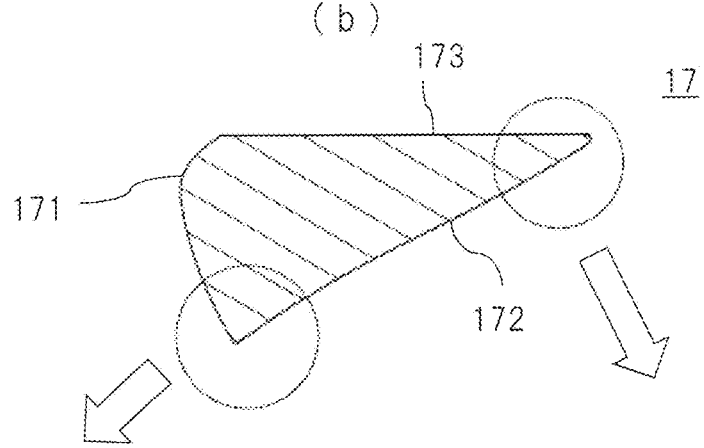
Figure 6:
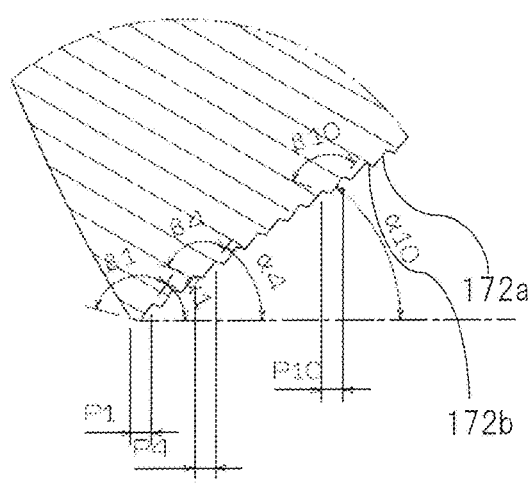
Figure 6:
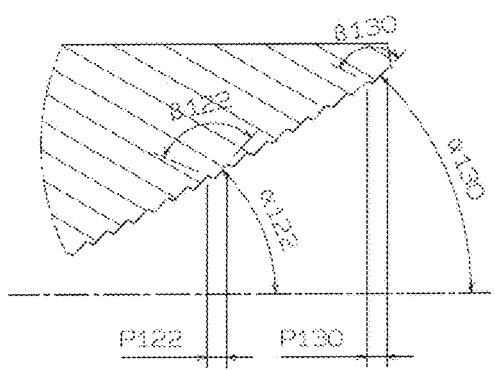

The light guide 17 is a member formed in a substantially triangular cross-section (see FIG. 6 (b)) by a translucent resin such as acrylic. As is apparent also from FIG. 6(a), the light guide 17 includes: a light-guide light-incident portion (surface) 171 opposing the emission surface of the above composite diffusion block 16 via the first diffuser 18a; a light-guide light-reflection portion (surface) 172 forming a slope; and a light-guide light-emission portion (surface) 173 opposing the liquid crystal display panel 52 of the liquid crystal display element 50 via the second diffuser 18b.

Many reflection surfaces 172a and connection surfaces 172b are alternately formed in serrate shapes on the light-guide light-reflection portion (surface) 172 of the light guide 17 as shown in FIGS. 6(c) and 6(d) which are partially enlarged views thereof. Then, the reflection surface 172a (a right-upward line segment in FIG. 6) forms an (n: natural number, for example, 1 to 130 in this case) with respect to a horizontal surface indicated by a dash-single-dot line in FIG. 6. As one example, the αn is set to 43 degrees or less (but 0 degree or more) in this case.

On the other hand, the connection surface 172b (a right-downward line segment in FIG. 6) forms βn (n: natural number, for example, 1 to 130 in this case) with respect to the horizontal surface. That is, the connection surface 17b of the reflection portion is inclined up to an angle which is shadowed with respect to incident light within a range of a half-value angle of a scattering body described later. Altogether detailed later, α1, α2, α3, α4, . . . each form an elevation angle of the reflection surface and β1, β2, β3, β4, . . . each form a relative angle between the reflection surface and the connection surface. As one example, the relative angle is set to 90 degrees or more (but 180 degrees or less). Incidentally, β1=β2=β3=β4= . . . =β20= . . . β130 in this case.

Figure 7:
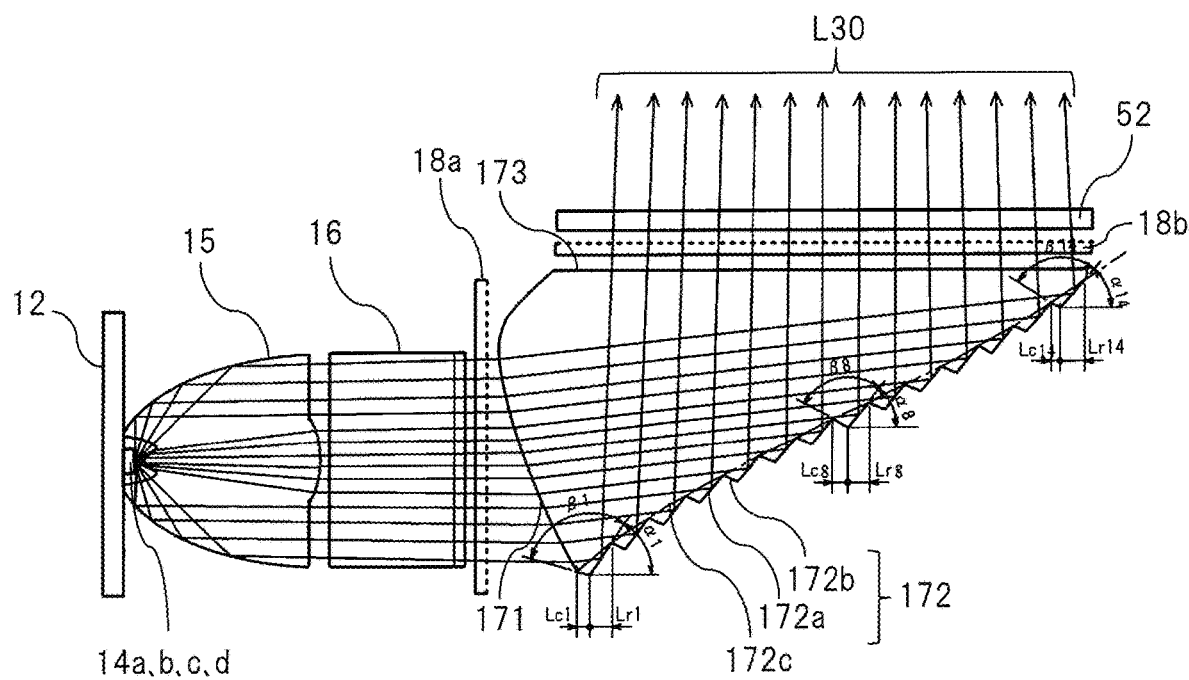
FIG. 7 is a view showing an operation of an internal optical system in the image display apparatus according to the first embodiment.
Figure 8:
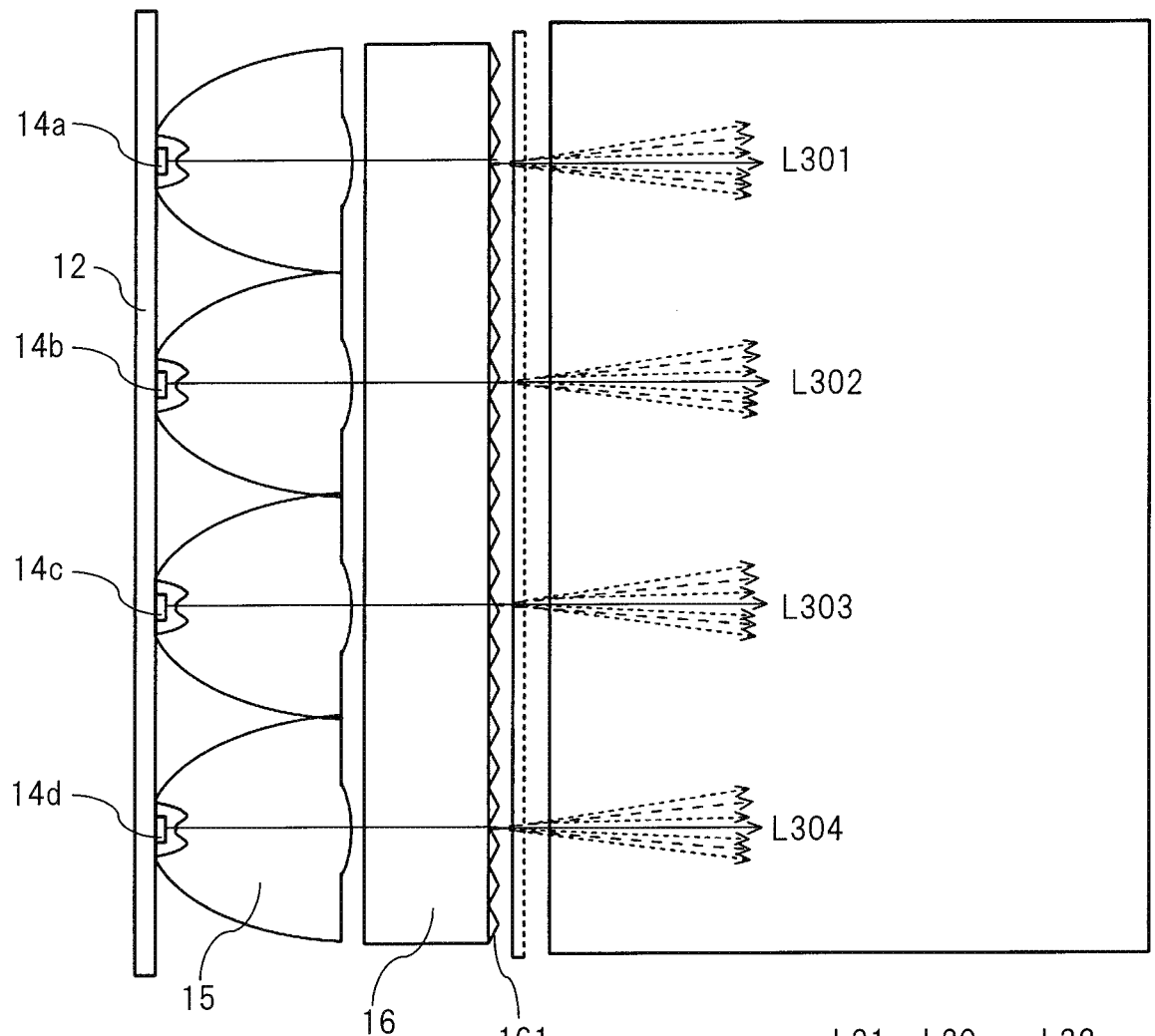
FIG. 8 is a diagram for explaining details of the light guide in the image display apparatus according to the first embodiment.
Figure 8:
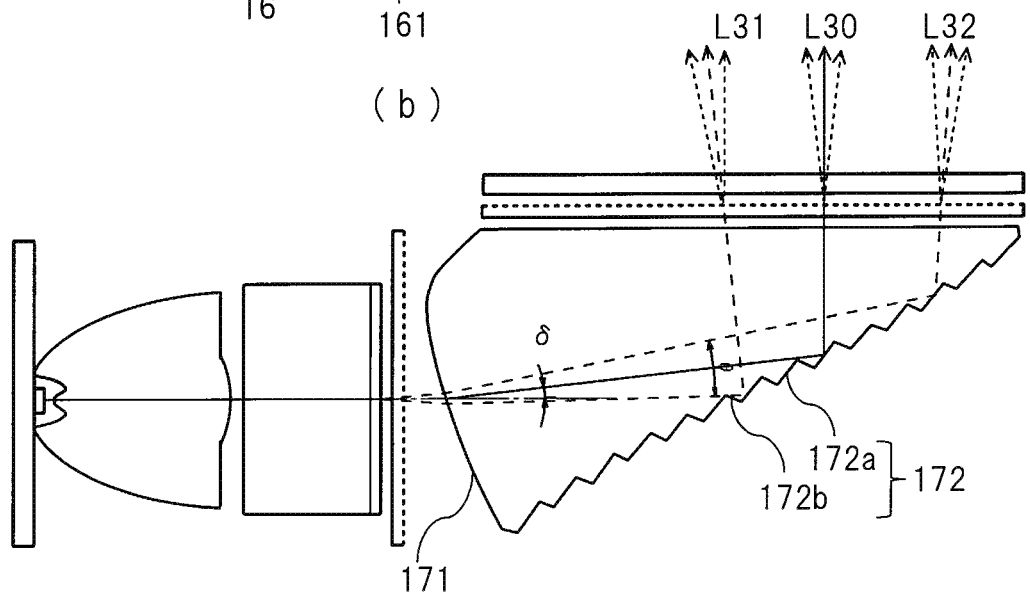

FIGS. 7 and 8 each show a schematic view in which sizes of the reflection surface 172a and the connection surface 172b are relatively increased with respect to the light guide 17 for explanation. A main light beam(s) is deflected by δ on the light-guide light-incident portion (surface) 171 of the light guide 17 in a direction in which an incident angle increases with respect to the reflection surface 172a (see FIG. 8(b)). That is, the light-guide light-incident portion (surface) 171 is formed in a curved convex shape inclining on a light source side. This indicates that parallel light beams from the emission surface of the composite diffusion block 16 are diffused through the first diffuser 18a, are incident on the light-guide light-incident portion (surface) 171, and reach the light-guide light-reflection (surface) 172 while slightly bending (deflecting) upward by light-guide light-incident portion (surface) 171 as is apparent also from FIG. 8(b) (see a comparative example in FIG. 9).

Incidentally, many reflection surfaces 172a and connection surfaces 172b are alternately formed in serrate shapes on the light-guide light-reflection portion (surface) 172; and diffusion light beams are totally reflected on each reflection surface 172a, verge upward, and are further incident, as parallel and diffusion light beams, on the liquid crystal display panel 52 through the light-guide light-emission portion (surface) 173 and the second diffuser 18b. Therefore, reflection-surface elevation angles α1, α2, α3, α4, . . . are set so that each reflection surface 172a has an angle equal to or greater than a critical angle with respect to the diffusion light while relative angles β1, β2, β3, β4, . . . among the reflection surfaces 172a and the connection surfaces 172b are set at the above-mentioned constant angles, more preferably an angle (βn≥90°) of 90° or more although a reason(s) for adopting the constant angles is described later.

Figure 9:
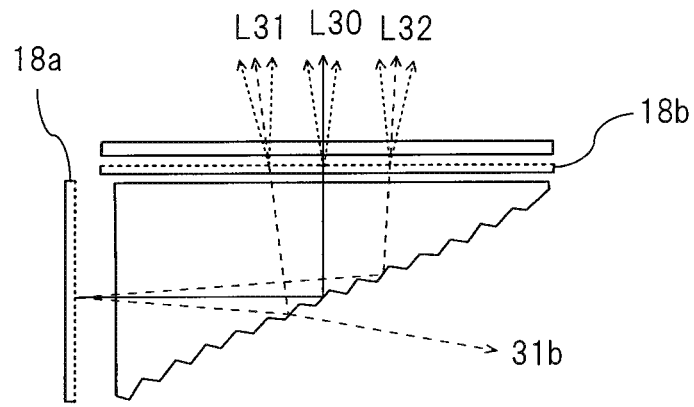
FIG. 9 is a view showing a comparative example for explaining the light guide in the image display apparatus according to the first embodiment.

The above-mentioned configuration is such a configuration that each reflection surface 172a always has an angle of a critical angle or more with respect to the diffusion light. Therefore, even if a reflection film made of metal or the like is not formed on the light-guide light-reflection portion (surface) 172, total reflection becomes possible and the image display apparatus 30 can be realized at low cost. Meanwhile, as shown in FIG. 9 illustrating a comparative example, when a bend (polarization) of the main light beam(s) is absent at the light-guide light-incident portion of the light guide 17, part of the diffusion light leads to having an angle of a critical angle or less with respect to the reflection surface 172a and sufficient reflectance cannot be secured, so that a light source apparatus with good (bright) characteristics, i.e., an image display apparatus cannot be realized.

Additionally, reflection-surface elevation angles α1, α2, α3, α4 . . . are values which slightly increase as they move from a lower portion of the light-guide light-reflection portion (surface) 172 to its upper portion. This is because the light transmitting the liquid crystal display panel 52 of the liquid crystal display element 50 has a certain level of divergence angle, particularly for the purpose of preventing occurrence of a phenomenon in which part of the light transmitting a peripheral portion of the liquid crystal display panel 52 is eclipsed (shaded) by a periphery of a mirror disposed downstream, a so-called peripheral darkening phenomenon, and because the image display apparatus realizes such a configuration that light beams near a peripheral portion of the liquid crystal display panel 52 are slightly deflected in a center-axial direction as shown by light beams L30 in FIG. 7.

Figure 12:
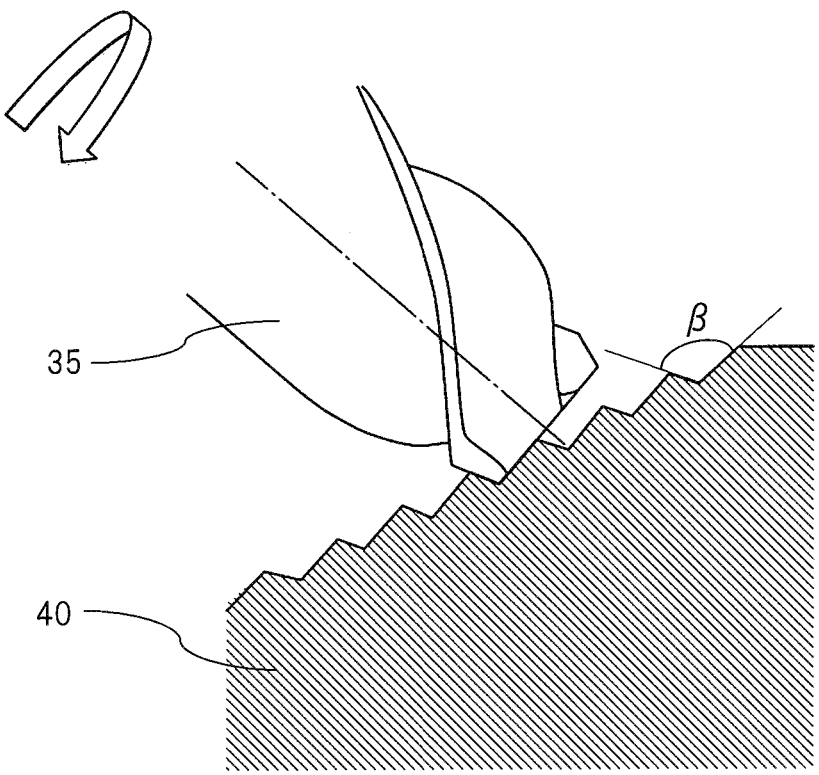
FIG. 12 is a diagram for explaining a machining method of a mold used for molding a light guide which is a component part of an optical system in the image display apparatus according to the first embodiment.

As described above, β1=β2=β3=β4 . . . βn≥90° is set. As shown also in FIG. 12, this is because when a mold 40 for manufacturing the light guide 17 by injection molding is machined, the reflection surface 172a and the connection surface 172b can be machined simultaneously by end mill having a relative angle β between a bottom surface and a side surface. The reflection surface 172a and the connection surface 172b can also be machined with a relatively thick tool(s), so that a machining time can be greatly shortened and machining costs can be drastically reduced. Further, a boundary edge between the reflection surface 172a and the connection surface 172b can be machined with high accuracy, which can improve light-guide characteristics of the light guide 17.

Also, each of Lr1, Lr2, Lr3, Lr4 . . . of FIG. 7 represents a projected length of the reflection surface 172a to the horizontal surface, and each of Lc1, Lc2, Lc3, Lc4 . . . represents a projection length of the connection surface 172b to the horizontal surface. Lr/Lc, i.e., a ratio of the reflection surface 172a and the connection surface 172b are constitutively variable depending on locations. An intensity distribution of the main light beams L30 incident on the light guide 17 does not necessarily coincide with an intensity distribution to be desired on an incident surface of the liquid crystal display panel. Therefore, adopted is a configuration in which the intensity distribution is adjusted by the ratio Lr/Lc of the reflection surface 172a and the connection surface 172b. Incidentally, as this ratio is increased, an average intensity of the reflected light at its portion can be enhanced. Generally, since a center area of the light beams L30 incident on the light guide tends to become high in intensity, values of the above ratio Lr/Lc are constitutively different depending on places in order to correct (adjust) the intensity, particularly, the center area is set so as to be small in intensity. Since the ratio Lr/Lc varies depending on locations and the above-mentioned reflection-surface elevation angles α1, α2, α3, α4 . . . differ depending on places, an envelope curve 172c representing an outer shape of the light-guide light-reflection portion (surface) 172 shows a curved shape as shown in FIG. 7.

Further, Lr1+Lc1=Lr2+Lc2=Lr3+Lc3=Lr4+Lc4 . . . =Lr+Lc≤0.6 mm is set in this case. Adoption of such a configuration makes it possible to equalize repetitive pitches of the reflection surface viewed from the light-guide light-emission portion (surface) 173 of the light guide 17. Each pitch has a value of 0.6 mm or less, so that when viewed through the liquid crystal display panel 52, the individual emission surfaces are viewed as a continuous surface without separation in cooperation with an action effect of the diffusers 18a, 18b. This brings uniformity of spatial luminance through the liquid crystal display panel 52, thereby improving display characteristics. That is, this configuration makes it possible to uniform incident-light intensity distributions on the liquid crystal display panel 52. On the other hand, if a value of Lr+Lc is less than 0.2 mm, a time of machining the mold becomes long and concurrently each reflection surface 172a is difficult to machine with good accuracy. Therefore, the above value is desirably 0.2 mm or more.

A shape of the light-guide light-reflection portion (surface) 172 of the above-described light guide 17 makes it possible to satisfy a total reflection condition of the main light beams, and to efficiently reflect it without requiring providing a reflection film such as aluminum to the light-guide light-reflection portion (surface) 172. Therefore, a brighter light source can be realized at low cost without requiring deposition work etc. of an aluminum thin film that accompanies an increase in manufacturing costs. Also, each relative angle β is set at such an angle that the connection surface 172b is shadowed with respect to some light beams of the main light beams L30 diffused by the composite diffusion block 16 and the diffuser 18a. This brings suppression of incidence of unnecessary light beams on the connection surface 172b, thereby making it possible to reduce reflection of the unnecessary light beams and to realize the image display apparatus with good characteristics.

Further, the above-described light guide 17 makes it possible to freely change an optical-axis-direction length of the light-guide light-emission portion (surface) 173 by appropriately setting the reflection-surface elevation angles α1, α2, α3, α4 . . . and the ratio Lr/Lc of the reflection surface and the connection surface. Therefore, such an image display apparatus can be realized that a size (screen size) of the light-guide light-emission portion (surface) 173 to the light-guide light-incident portion (surface) 171 is variable to an appropriately required size (screen size) corresponding to an apparatus such as the above-mentioned liquid crystal display panel 52. This also means that the light-guide light-emission portion (surface) 173 is formed into a desired shape without depending on arrangement form of the LEDs 14a, 14b configuring the light source and thereby a plane light emitting source having a desired shape can be obtained. Further, the present configuration can make thicknesses of the LED collimator 15 and the composite diffusion block 16 smaller (thinner) with respect to the size of the liquid crystal display panel 52, and so may be advantageous also for the miniaturization of the entire apparatus.

Figure 10:
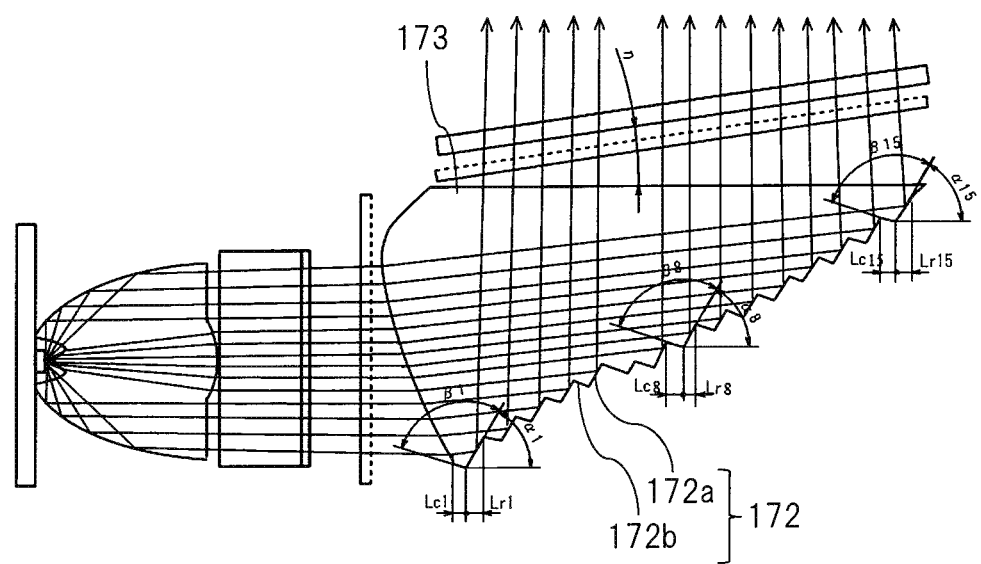
FIG. 10 is a view showing a detailed shape of a light guide in an image display apparatus which is a modification example of the first embodiment.

Further, as shown also in FIG. 10, the above-mentioned light guide 17 appropriately sets the connection surface 172b constituting the light-guide light-reflection portion (surface) 172 (so that light is not reflected to the reflection surface 172a as part of its center portion in this case). Such setting also makes it possible to extremely change the ratio Lr/Lc of the reflection surface 172a and the connection surface 172b on the light-guide light-emission portion (surface) 173 of the light guide 17 depending on a location(s). This state is illustrated in an example of FIG. so that the light beams emitted from the light-guide light-emission portion (surface) 173 of the light guide 17 are divided (separated) into right and left sides with respect to the optical-axis direction. Such a configuration may be suitable for, for example, a case etc. of separating upward/downward or rightward/leftward the illumination light emitted from the HUD apparatus without loss. Further, appropriate adjustment of the ratio Lr/Lc also makes it possible to partially strengthen or weaken an intensity of the reflected light.

Figure 11:
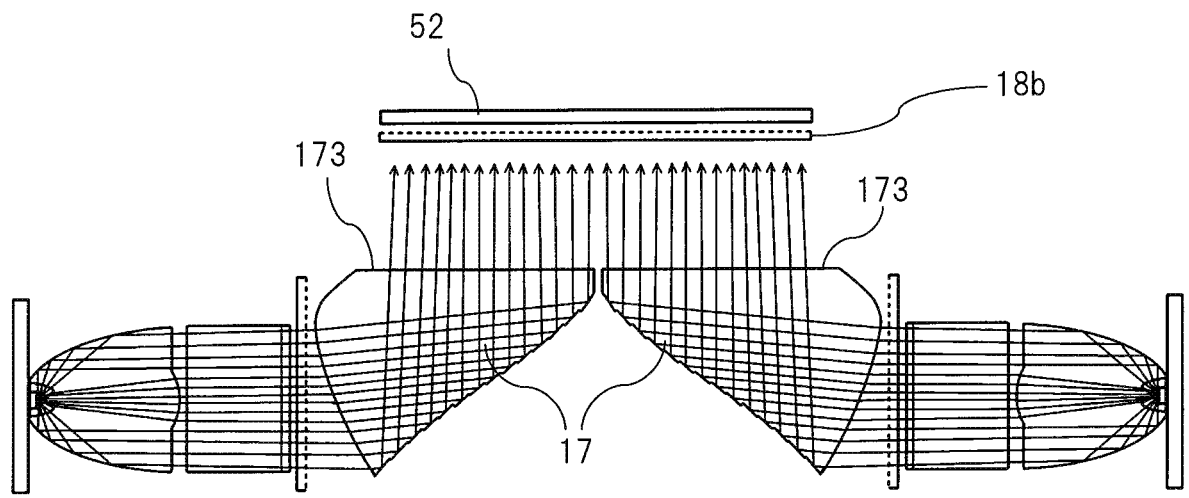
FIG. 11 is a view showing a detailed shape of a light guide in an image display apparatus which is a modification example of the first embodiment.

Additionally, as shown also in FIG. 11, if a plurality (two in this case) of light source apparatus each including the above-mentioned LEDs 14a, 14b and light guide 17, etc. are combined so as to oppose each other in the same surface, the combination makes it possible to realize an image display apparatus including a light-guide light-emission portion (surface) 173 having further many kinds of surface sizes and light quantities.

Here, a desirable inclination of the main light beam incident on the liquid crystal display panel is generally close to vertical. However, the main light beam may be inclined by an angle η depending on characteristics of the liquid crystal display panel, as shown in FIG. 10. That is, some commercially available liquid crystal panels have good characteristics by tilting an incident angle by about 5° to 10°. In this case, however, the above angle η is desirably set to 5° to 10° in accordance with the characteristics of the panels.

Instead of tilting the panel by the angle η, adjusting the angle of the reflection surface 172a also makes it possible to tilt the main light beam incident on the liquid crystal panel. Further, when the light beam requires being tilted in a lateral direction of the light guide, the requirement may be realized by: making, rightward/leftward asymmetric, an inclination of a below-detailed triangular texture 161 formed on the light emission surface of the composite diffusion block 16; or changing a formation direction of a texture composed of the reflection surface 172a and the connection surface 172b.

Figure 13:
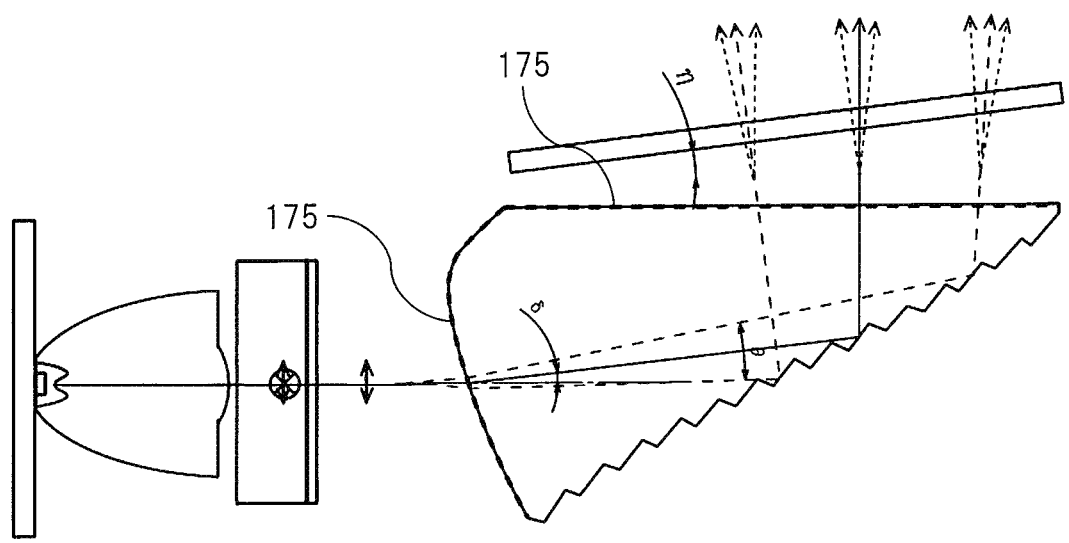
FIG. 13 is a view showing a detailed shape of a light guide in an image display apparatus which is a modification example of the first embodiment.

Additionally, as shown also in FIG. 13, if the following functional scattering surface 175 is added to (formed on) each of the incident surface and emission surface of the above-mentioned light guide 17, the diffusers 18a, 18b shown also in FIG. 6 may be omitted. Adoption of this configuration makes the diffusers 18a, 18b unnecessary and makes it possible to realize a reduction in costs of the image display apparatus.

Figure 14:
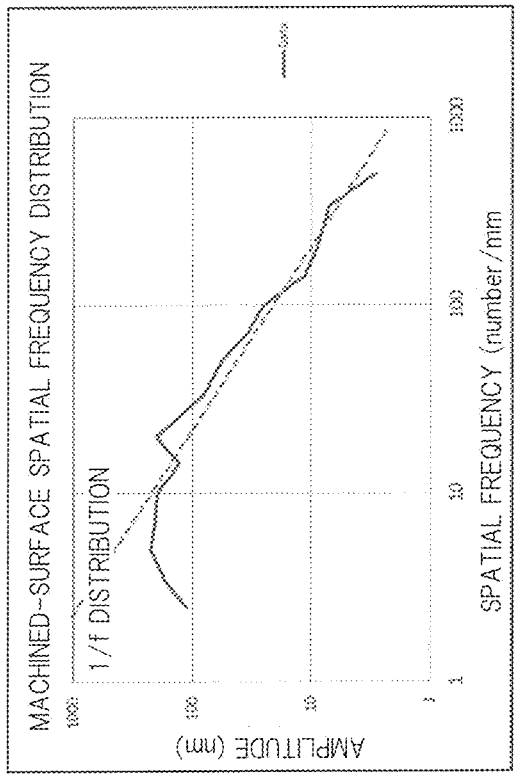
FIG. 14 is a characteristic diagram showing a surface-roughness spatial frequency distribution of the light guide in the image display apparatus shown in FIG. 13.
Figure 14:
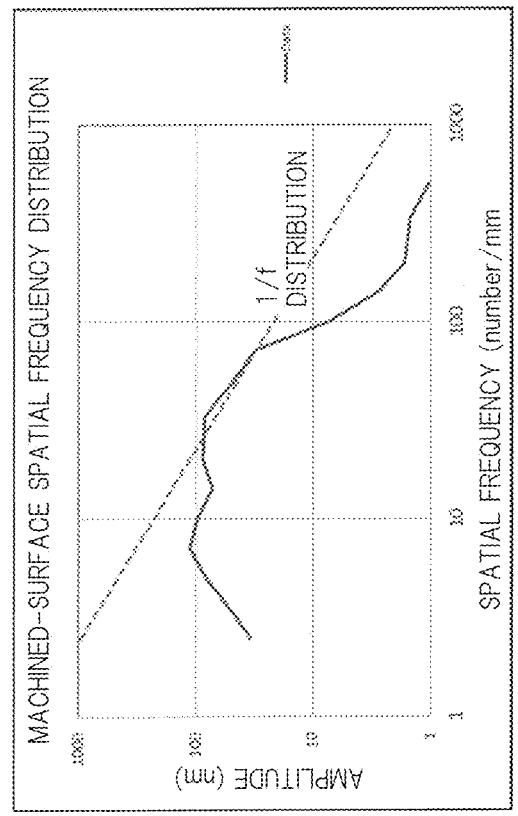
Figure 15:
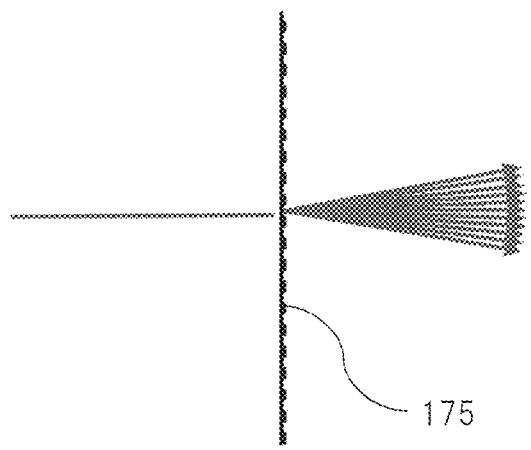
FIG. 15 is a view schematically showing light scattering on a surface of the light guide in the image display apparatus shown in FIG. 13.
Figure 15:
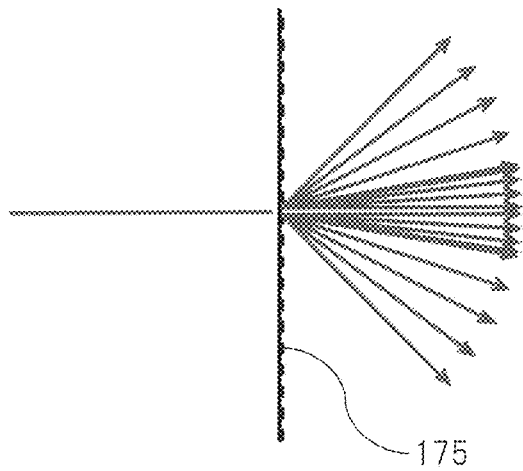

This functional scattering surface is intended to reduce a unnecessary divergent component(s) by reducing surface roughness of a component (fine component) having a high spatial frequency. FIG. 14(b) shows a surface-roughness spatial frequency component of a normal scattering surface, and FIG. 14(a) shows a surface-roughness spatial frequency component of a scattering surface having more preferable scattering characteristics. As shown in FIG. 14, a surface-roughness spatial frequency distribution of the normal scattering surface shows a distribution indicated along a reciprocal (1/f) of the spatial frequency. In contrast thereto, a spatial frequency distribution of the more preferable surface roughness has low values in a low frequency region with a spatial frequency of 10/mm or less and in a high frequency region of 100/mm or more. Since the surface-toughness spatial frequency has small low frequency components and moderate medium frequency components, a light source with little scattering unevenness can be realized. Also, since the surface-roughness spatial frequency has the small high frequency components, a scattering angle of scattered light does not become large and, as shown in FIG. 15(a), a direction of the light scattered on the functional scattering surface can be limited to a direction usable as a light source, which makes it possible to realize alight source having a bright and uniform luminance distribution. Contrarily, as shown in FIG. 15(b), the normal scattering surface scatters light in a direction(s) other than a direction usable as a light source, which makes it impossible to realize a bright light source.

Figure 16:
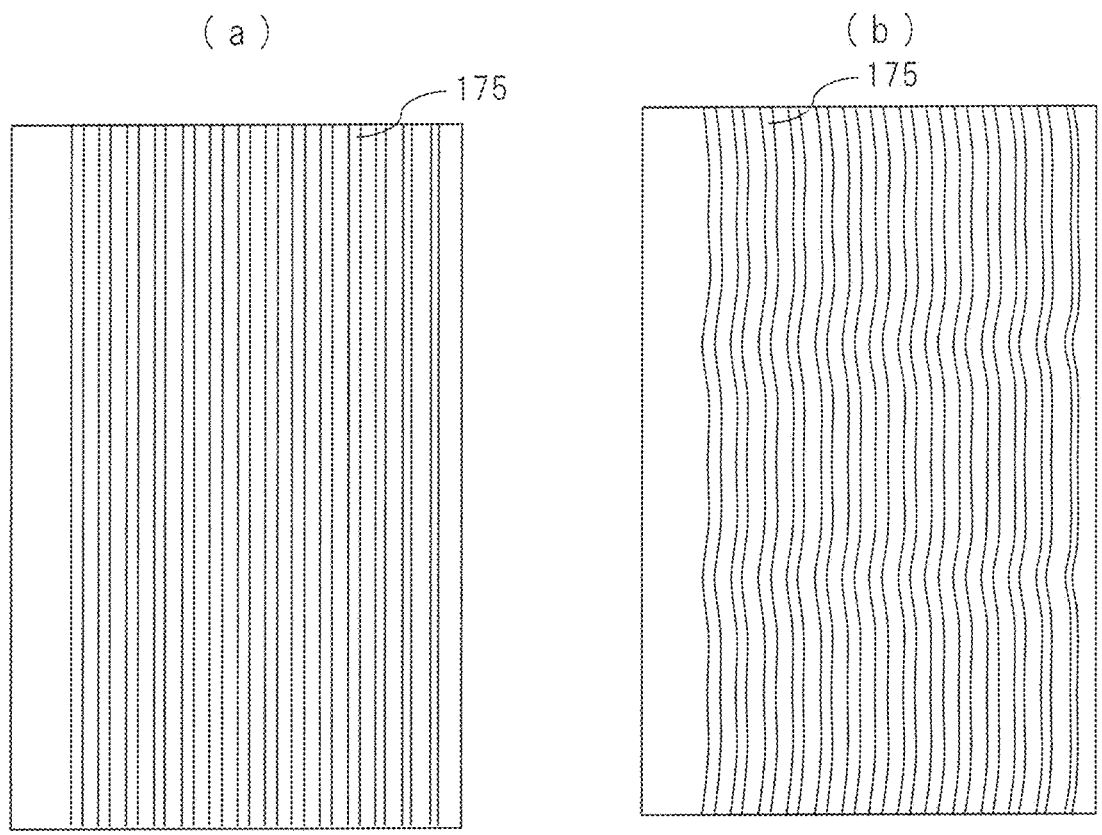
FIG. 16 is a plan view showing a shape of a surface of a light guide in an image display apparatus which is a modification example of the first embodiment.

FIG. 16 is a partially enlarged view showing a specific example of the above-described texture 161 formed on the incident or emission surface of the light guide 17. In this schematic view, FIG. 16(a) shows one example in which each boundary between the reflection surface (or emission surface) and the connection surface is arranged and formed in a straight line, and FIG. 16(b) shows another example in which the boundaries are arranged and formed in curved shapes, for example, in a state etc. of being respectively spaced, dispersed, and arranged from the LEDs 14a, 14b serving as light sources as necessary.

That is, adoption of the above-described functional scattering surface leads to an increase of a degree of freedom of control about incidence and emission of the light at the incident and emission surfaces of the light guide 17, brings a reduction of luminance unevenness of light emitted from the light source apparatus, makes it possible to perform fine control in accordance with characteristics of an optical-system apparatus (liquid crystal display element 50 in this case) arranged on its downstream side, and may further be advantageous for a reduction in costs of the apparatus.

<Details of Composite Diffusion Block>

Figure 17:
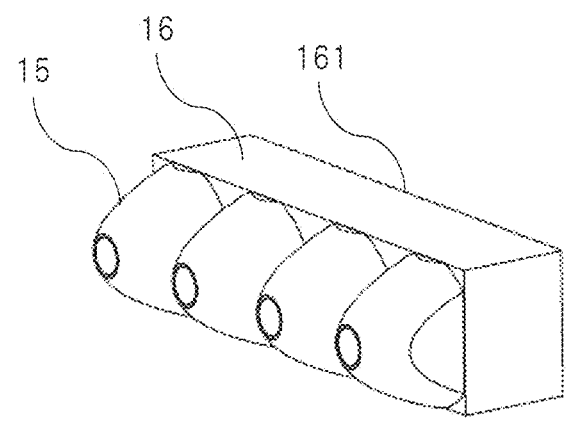
FIG. 17 is a diagram for explaining details of a collimator and a composite diffusion block in a light source apparatus.
Figure 18:
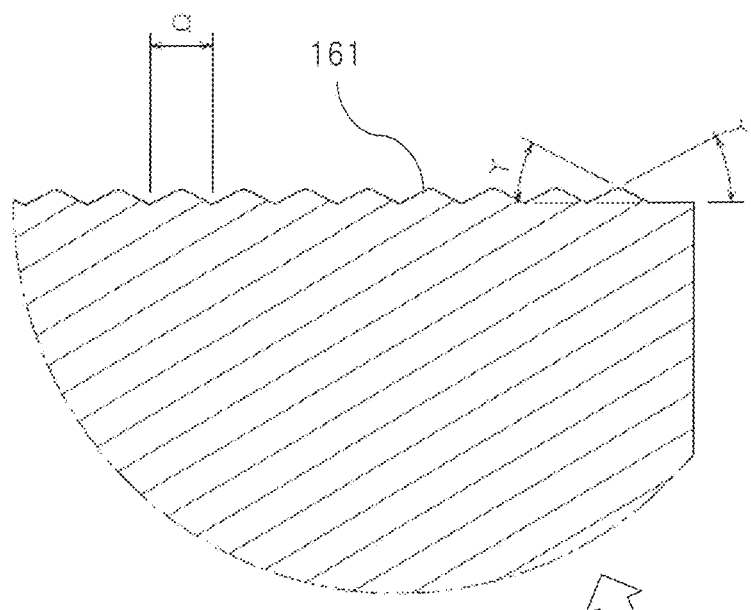
FIG. 18 is a partially enlarged cross-sectional view for explaining the details of the composite diffusion block in the light source apparatus.
Figure 18:
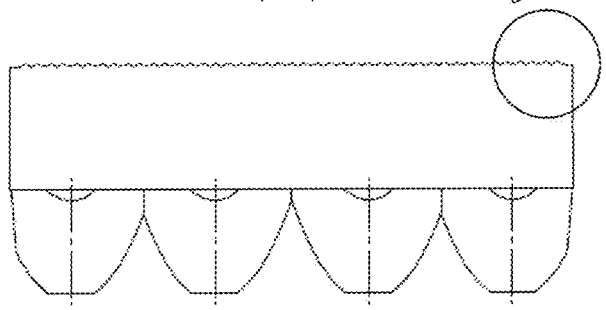

Subsequently, the composite diffusion block 16, which is another component of the image display apparatus 30, will be described with reference to FIGS. 17 and 18. Incidentally, FIG. 17 shows a composite diffusion block 16 integrated with the LED collimator 15, and FIGS. 18(a) and 18(b) each show a partially enlarged cross-sectional view of the composite diffusion block 16.

As is apparent also from FIG. 18(a), many textures 161 each having a cross-section of a substantially triangular shape are formed on the emission surface of the composite diffusion block 16 formed in a prismatic shape and of a translucent resin such as acrylic. By action of the texture 161, the light emitted from the LED collimator 15 is diffused in a direction that is vertical to the light-guide light-incident portion (surface) 171 of the above light guide 17 in the drawing of FIG. 18(a). Then, even if the LED collimators 15 are discretely arranged due to interaction between the substantially triangular texture 161 and the diffusers 18a, 18b, the discrete arrangement makes it possible to equalize an individual intensity distribution of the light emitted from the light-guide light-emission portion (surface) 173 of the light guide 17.

Particularly, the above-mentioned texture 161 makes it possible to restrict the diffusion direction to the lateral direction of of the light guide, and further to control the diffusibility in the lateral direction. Therefore, the first and second diffusers 18a, 18b can be weakened on isotropic diffusibility, which consequently leads to improvement of light utilization efficiency, and realization of the image display apparatus with good characteristics. Incidentally, this embodiment shows, as one example, the substantially triangular texture 161 having an angle y=30 degrees and its forming pitch a=0.5 mm. However, it will be apparent to those skilled in the art that this texture 161 may utilize the functional scattering surface shown in FIGS. 13 to 16 described above. Incidentally, the texture formed on the diffusion block is not limited to a substantially triangular shape, and may be a concentric circular shape which adapts, for example, a discrete arrangement of the LED collimator 15 and the center axis of each LED collimator 15.

Figure 19:
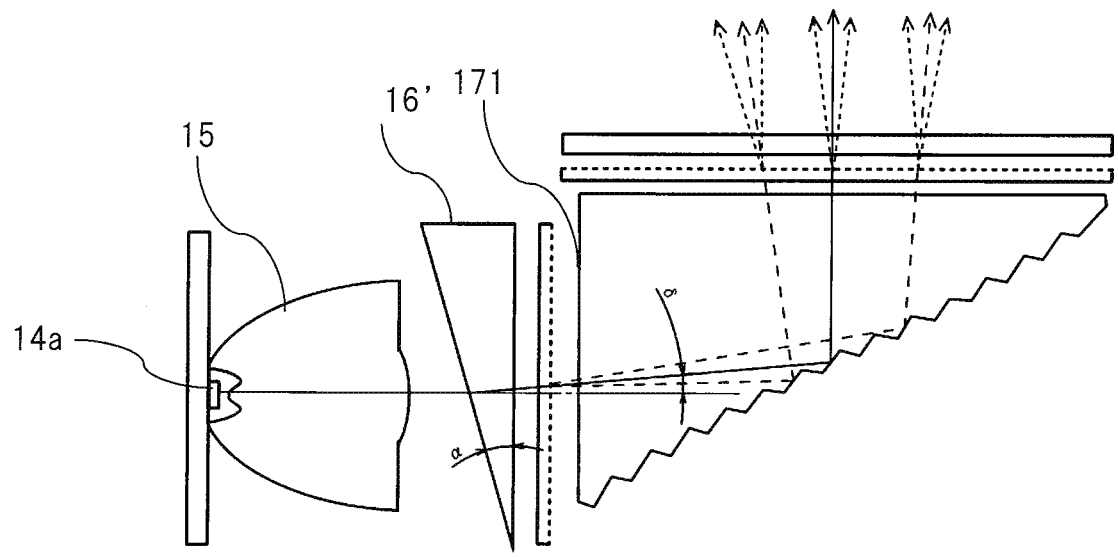
FIG. 19 is a view showing a configuration of an image display apparatus which is a modification example of the first embodiment.

As shown in FIG. 19, the composite diffusion block 16 may be also replaced with a so-called wedge-shaped refractive member 16' having a triangular prism shape instead of the above-mentioned prismatic shape. The refractive member causes the light, which is emitted from the LED collimator 15 including the LEDs 14a, 14b as light sources, to be refracted in a desired direction (upward in FIG. 19), so that the light can be made incident also on the flat incident surface of the light guide 17 by tilting only a desired angle. This brings unnecessity for forming the light-guide light-incident portion (surface) 171 of the light guide 17 into a curved, convex shape inclined on a light source side as shown in FIGS. 5 to 7, thereby making it possible to ensure the total reflection at its reflection surface 172a. Therefore, a structure of the present embodiment is more easily manufactured.

Figure 20:
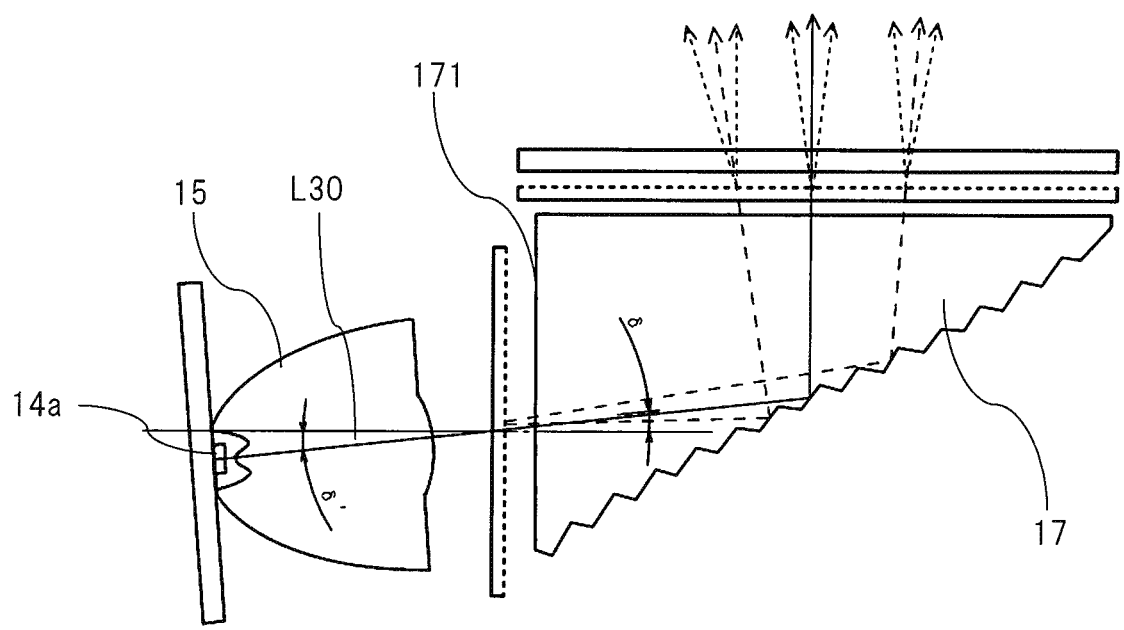
FIG. 20 is a view showing a configuration of an image display apparatus which is a modification example of the first embodiment.

Additionally, as shown also in FIG. 20, inclining an arrangement angle of the LED collimator 15 including the LEDs 14a, 14b as light sources without providing the above-described composite diffusion block 16 may also realize a bright light source (s) by ensuring the total reflection on the reflection surface 172a. Incidentally, since the light beam L30 emitted from the LED is refracted at the light-guide light-incident portion (surface) 171 of the light guide 17, an inclination angle δ' of the LED collimator 15 does not necessarily coincide with the inclination angle δ of the light beam lying inside the light guide 17 (δ'≠δ), and so care should be taken thereof.

As detailed above, the image display apparatus 30 according to the first embodiment of the present invention makes it possible to further improve the light utilization efficiency of the light emitted from the LED light source and its uniform illumination characteristics and be simultaneously manufactured as a modularized image display apparatus at a small size and at low cost.

Other Embodiments

Figure 21:
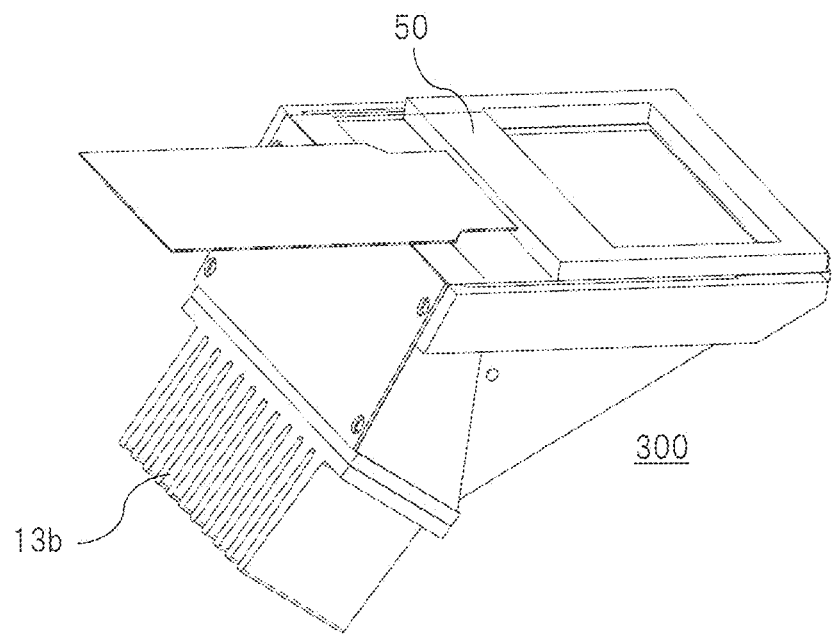
FIG. 21 is a view showing the entire appearance of an image display apparatus according to another embodiment of the present invention.
Figure 22:
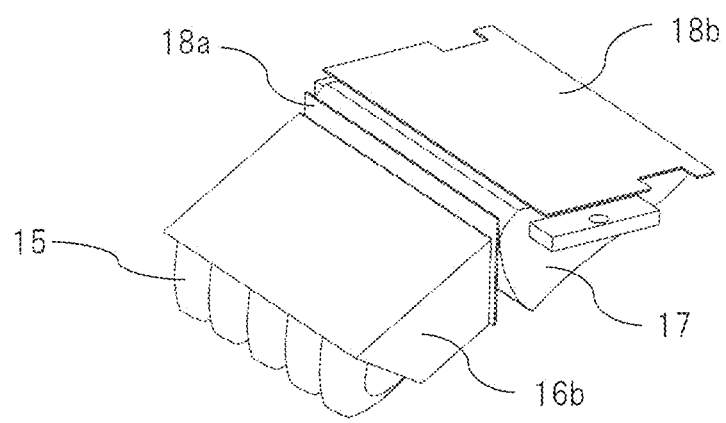
FIG. 22 is a view showing an appearance of an internal configuration of an optical system in an image display apparatus according to another embodiment of the present invention.

Meanwhile, FIGS. 21 and 22 show perspective views of the entire appearance and an internal configuration of an image display apparatus 300 according to another embodiment of the present invention. In another embodiment, the LED collimator 15 that has a plurality of conical, convex shapes and to which the LEDs are attached is attached at an inclined position below the apparatus by utilizing the composite diffusion block 16b having a substantially trapezoidal cross-section. Incidentally, reference numeral 13b in FIG. 21 denotes a heatsink for cooling heat generated by the LED element and the control circuit.

Figure 23:
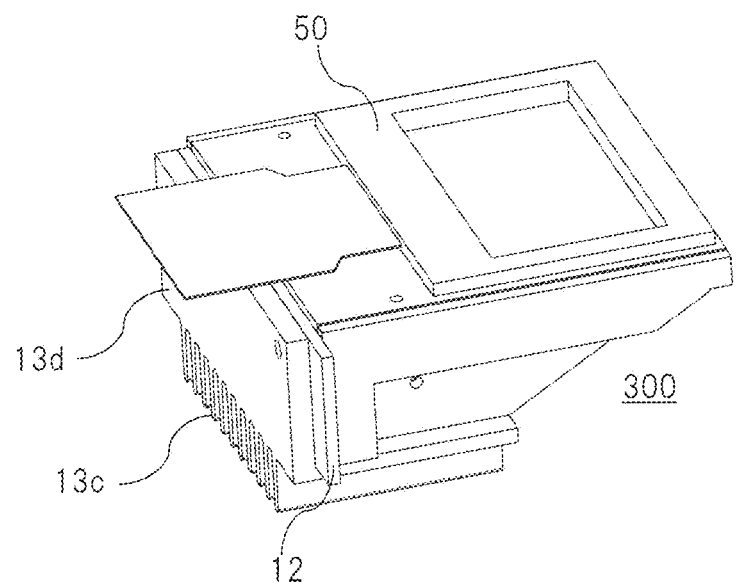
FIG. 23 is a view showing the entire appearance of an image display apparatus according to another embodiment of the present invention.

FIG. 23 shows a perspective view of the entire appearance of an image display apparatus 300 according to still another embodiment of the present invention. In this embodiment, although not detailed by illustration, such a structure is adopted that the heat generated in the LED substrate 12 propagates through a heat transfer plate 13d and is cooled by a heatsink 13c disposed at a lower portion of the apparatus.

This configuration makes it possible to realize a light source apparatus short in the entire length.

Second Embodiment

<Light Source Apparatus Having Polarization Function>

Subsequently, a second embodiment of the present invention will be detailed below with reference to FIGS. 24 to 30. Incidentally, this second embodiment is different from the first embodiment in an image display apparatus in which the light from a light source apparatus is emitted as polarization such as S-polarization or P-polarization. However, it is the same as the above to realize a modularized, downsized, highly-efficient image display apparatus usable as a plane light source.

Figure 24:
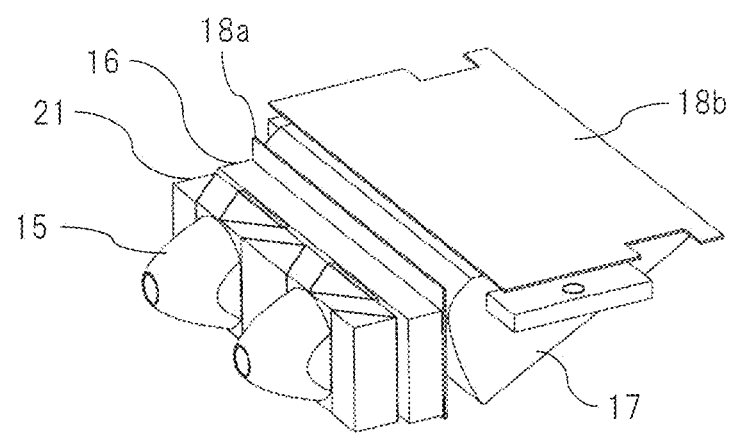
FIG. 24 is a view showing an example of a structure of an optical system in an image display apparatus according to a second embodiment of the present invention.
Figure 25:
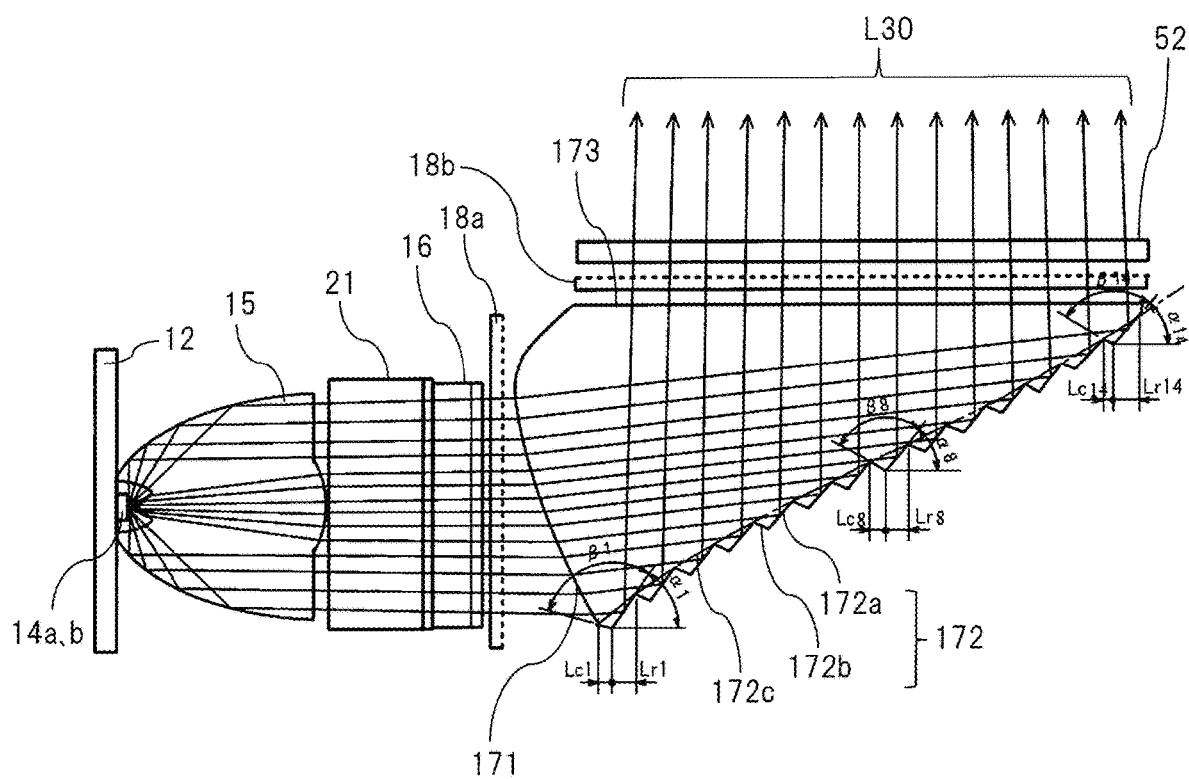
FIG. 25 is a diagram for explaining the optical system in the image display apparatus according to the second embodiment.
Figure 26:
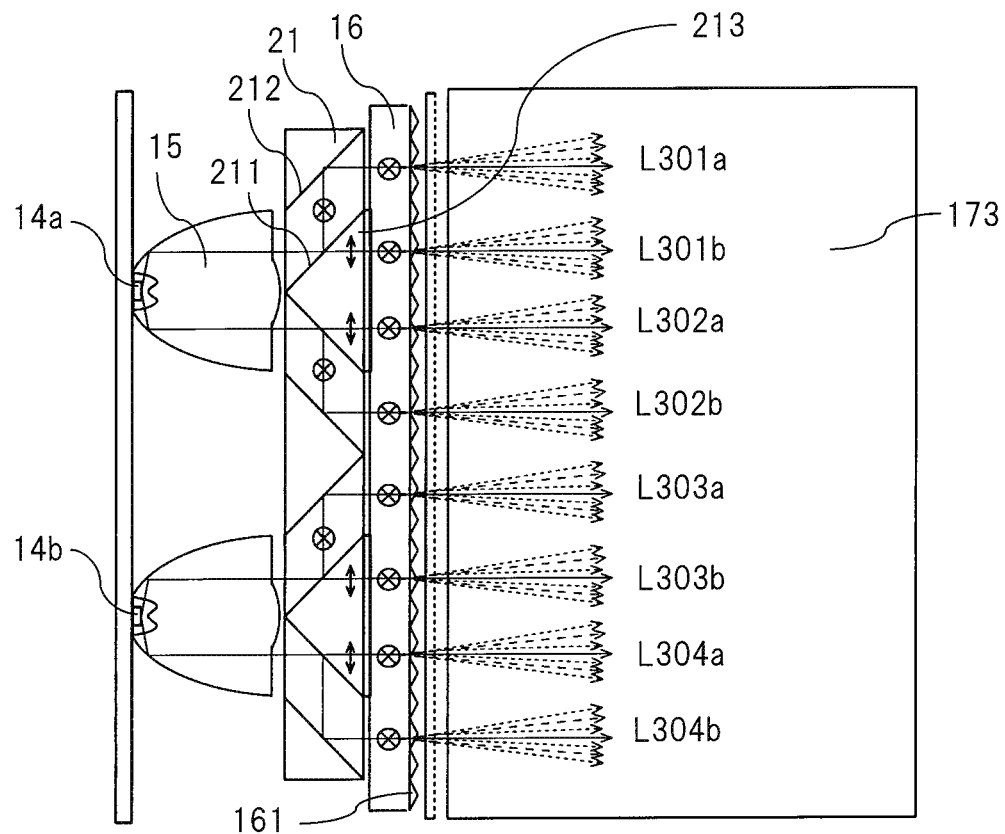
FIG. 26 is a top view and a side view for explaining details of a light guide in the image display apparatus according to the second embodiment.
Figure 26:
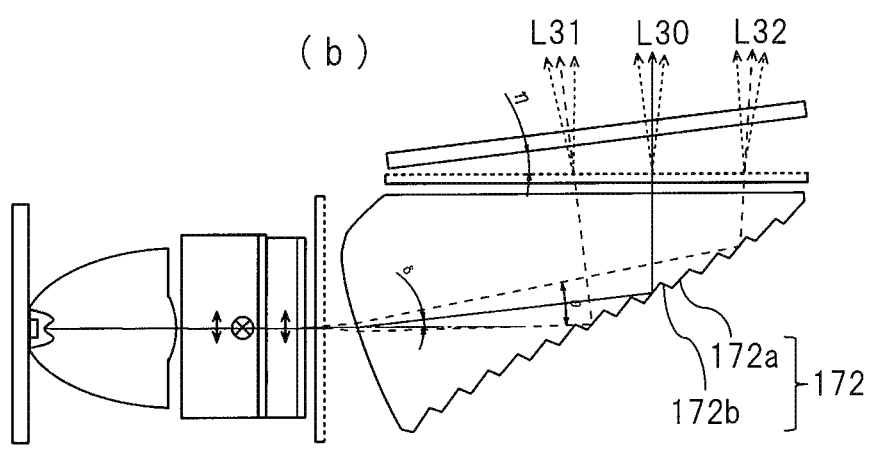

FIGS. 24 to 26 each show a configuration of the image display apparatus according to the second embodiment, particularly, a configuration of an optical system to be its feature. That is, this second embodiment is configured so that the number of LEDs 14a, 14b constituting the light source therein is set at, as one example, two which is one half of that in the first embodiment, and that a polarization conversion element 21 is provided between each LED collimator 15 and the composite diffusion block 16. Incidentally, the other configurations in the figures are the same as those in those of the first embodiment, and are denoted by the same reference numerals, and so their detailed descriptions will be omitted here for avoiding duplication.

Additionally, as is particularly apparent also in FIG. 26(*a*) out of these drawings, the polarization conversion element 21 combines: a columnar (hereinafter, parallelogrammic pillar), translucent member with a cross-section of a parallelogram extending along a direction perpendicular to the figure; and a columnar (hereinafter, triangular pillar), translucent member with a triangular cross-section, and is formed by arranging a plurality of combinations thereof in an array shape and in parallel (in a direction perpendicular to the drawing of the figure in this case) to a surface orthogonal to the optical axis of the parallel light from the LED collimator 15. Further, a polarizing beam splitter (hereinafter, abbreviated as "PBS") film 211 and a reflection film 212 are provided alternately at interfaces among those adjacent translucent members arranged in the array shape. Additionally, the emission surface to which the light incident on the polarization conversion element 21 and passing through the PBS film 211 is emitted is equipped with a half wave plate 213.

In this way, the polarization conversion element 21 is configured as a surface (a perpendicular surface extending perpendicularly in the drawing of the figure) formed by the optical axis of the parallel light from the LED collimator 15 and an extension direction of the parallelogrammic-pillar, translucent member, a so-called symmetrical surface with respect to the optical-axis surface of the parallel light. Additionally, respective inclinations of the parallelogrammic pillar and the triangular column of the translucent member, which is a constituent element thereof, are set to 45 degrees with respect to its optical-axis surface. Then, the polarization conversion element 21 is configured as polarization conversion elements divided into two sets in a perpendicular direction of the figure with respect to the parallel light beams from the two LED collimators 15.

By the polarization converting element 21 configured as described above, as is apparent also from FIG. 26(*a*), for example, an S-polarization wave (see the symbol (x) in FIG. 26) of the incident light, which has been parallel light by the LED collimator 15 after emission from the LED 14a, is reflected by the PBS film 211, and is further reflected by the reflection film 212 to reach the incident surface of the composite diffusion block 16. On the other hand, after transmitting the PBS film 211, a P-polarization wave (see upper and lower arrows in FIG. 26) becomes an S-polarization wave by the half wave plate 213, and leads to reaching the incident surface of the composite diffusion block 16.

In this way, by the polarization conversion element 21, all of the light beams emitted from the LED(s) and converted into parallel light by the LED collimator 15 become S-polarization waves and lead to being incident on the incident surface of the composite diffusion block 16. Thereafter, the light beams emitted from the emission surface of the composite diffusion block 16 are incident on the above-detailed light guide 17 via the first diffuser 18a, are further reflected in an upper direction of FIG. 26(*b*) by the action of the light guide 17, and are guided to the incident surface of the liquid crystal display element 50. This flow is the same as that of the first embodiment. Incidentally, the action of the light guide 17 has already been detailed above, and so its description will be omitted here for avoiding duplication.

Figure 27:
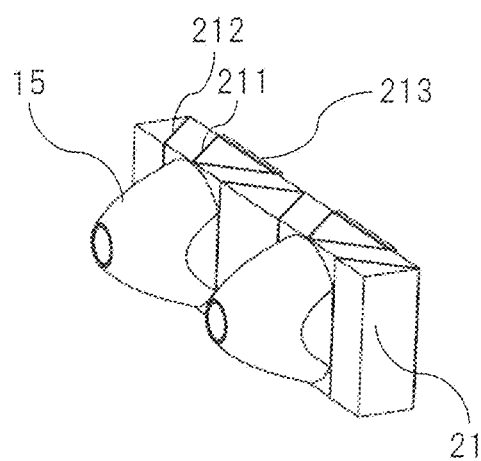
FIG. 27 is a diagram showing an example of structures of an LED collimator and a polarization conversion prism which are component parts of the optical system of the image display apparatus according to the second embodiment.
Figure 29:
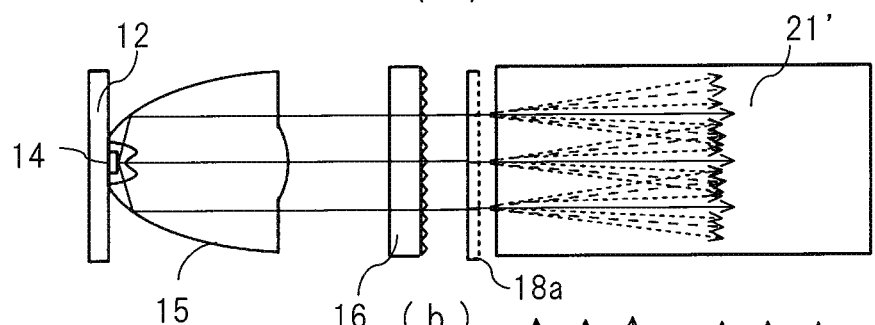
FIG. 29 is a top view and a side view for explaining details of a light guide in an image display apparatus which is a modification example of the second embodiment.
Figure 29:
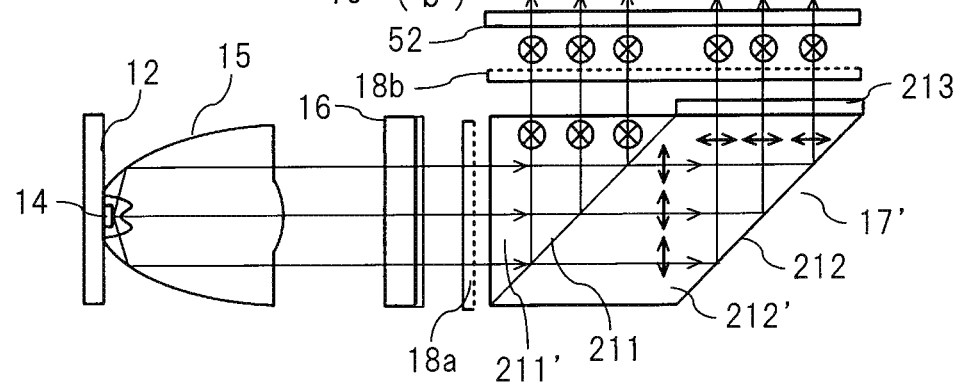
Figure 30:
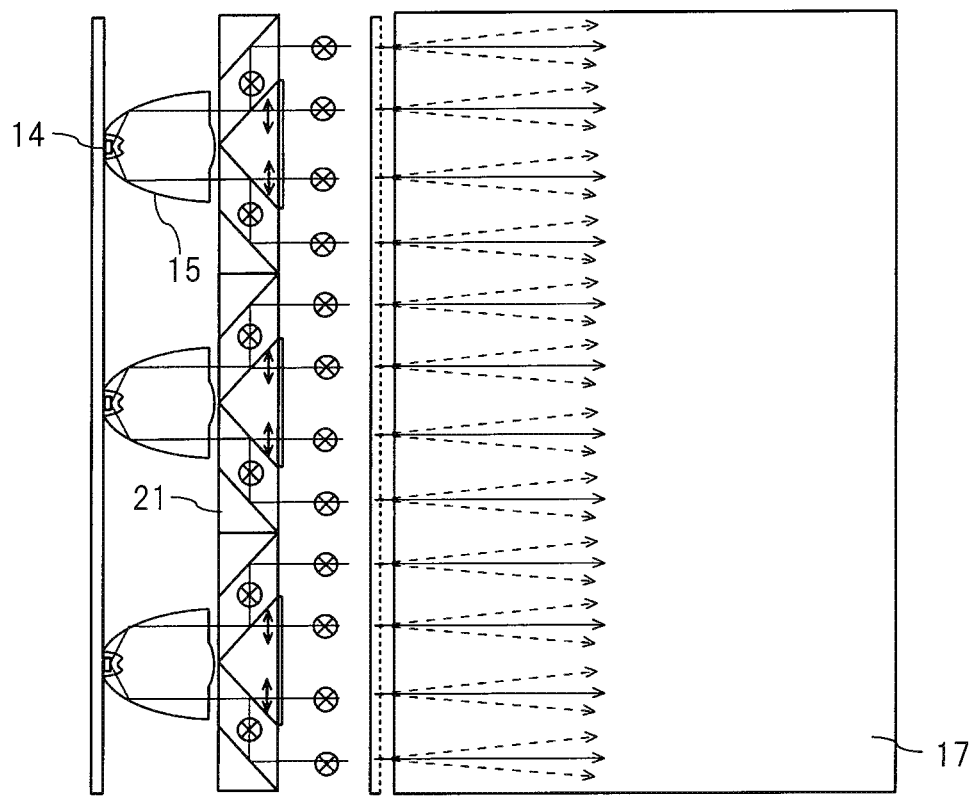
FIG. 30 is a top view and a side view for explaining details of a light guide in an image display apparatus which is a modification example of the second embodiment.
Figure 30:
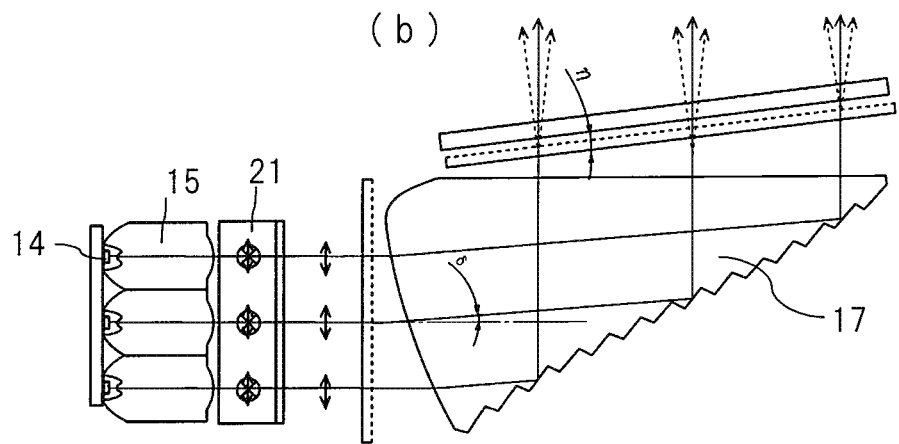

Incidentally, FIG. 27 is a perspective view showing a state of attaching the above-mentioned two LED collimators 15 to the polarization conversion element 21. Further, FIG. 29 is a view showing a configuration of an appearance of a composite diffusion block 16 to be attached on an emission surface side of the polarization conversion element, and FIG. 30 is aside view showing a detailed structure of the composite diffusion block 16 and its partially enlarged cross-sectional view. As is apparent also from these figures, many textures 161 each having a subsequently triangular cross-section are similarly formed on the emission surface of the composite diffusion block 16 also in the second embodiment. However, its details have already been described above, and so will be omitted here. Additionally, it will be apparent to those skilled in the art that, also in this composite diffusion block 16, almost the same effect may be achieved by using the functional scattering surface shown also in FIGS. 13 to 16 as the texture 161 to be formed on its surface.

In this way, the image display apparatus according to the second embodiment described above converts, into a desired polarization wave (S-polarization wave in this case) by the above-mentioned polarization conversion element 21, the light incident on the liquid crystal display panel 52 constituting the liquid crystal display element 50, thereby making it possible to attain an effect based on polarization characteristics of the image light to be emitted so as to improve etc. transmittance of the light to the liquid crystal display panel. Therefore, a more downsized, highly-efficient, modularized image display apparatus can be achieved at low cost by using the less light emitting source (LED) in number. Incidentally, a case of attaching the polarization conversion element 21 behind the LED collimator 15 has been described above. However, the present invention is not limited thereto, and it will be apparent to those skilled in the art that almost the same action effect are obtained also by providing it in (on the way to) an optical path reaching the liquid crystal display element.

Figure 28:
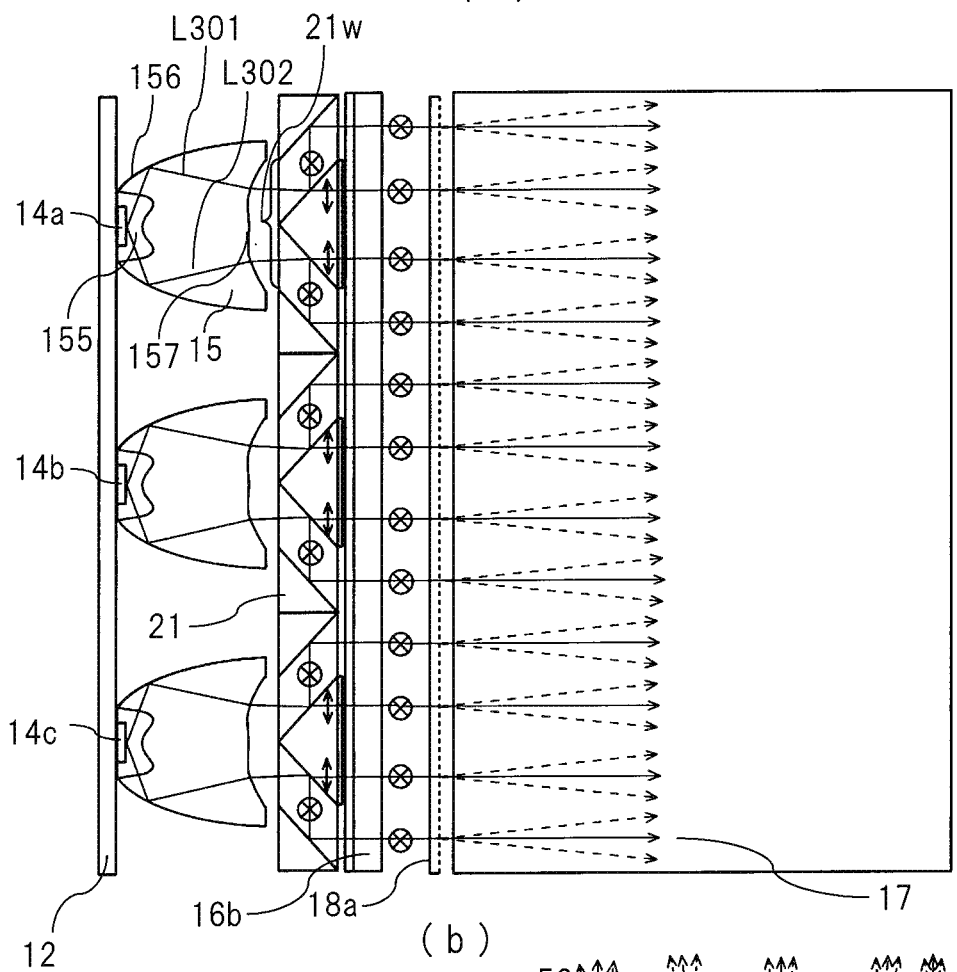
FIG. 28 is a top view and a side view showing details of a light guide in an image display apparatus which is a modification example of the second embodiment.
Figure 28:
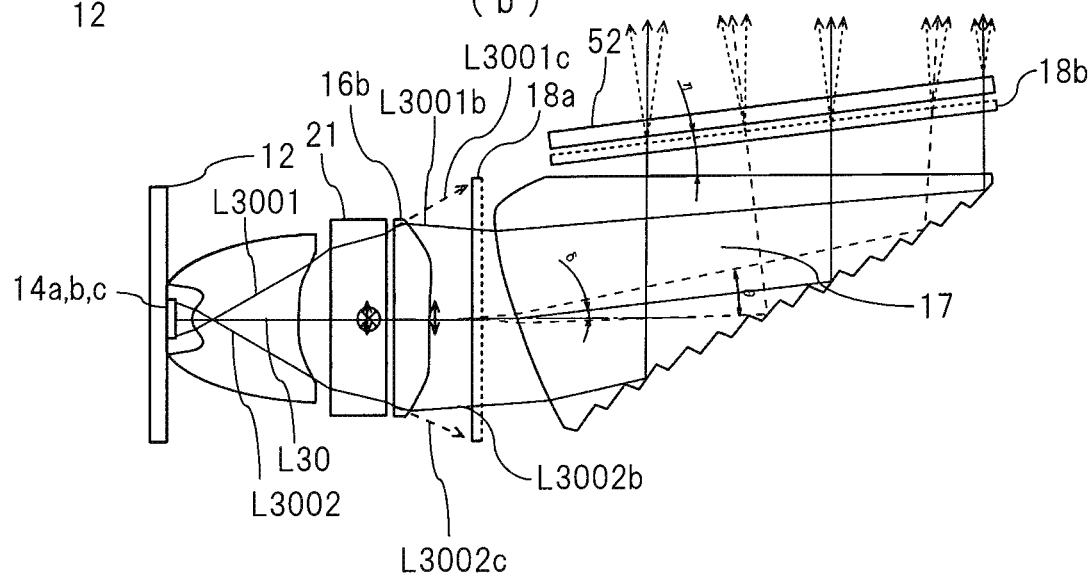

FIG. 28 shows a configuration of the above-mentioned image display apparatus in which; the number of LEDs 14a, 14b, 14c constituting the light source is three; and the polarization conversion element 21 is provided between each LED collimator 15 and the composite diffusion block 16, but an orientation control plate 16c is disposed instead of the composite diffusion block 16 constituting the orientation control plate. Also, this configuration has a feature of using a relatively larger LED 14 than a shape of the LED collimator 15. In accordance therewith, a shape of a light incident portion 155 of the LED collimator 15 is larger than that of the other embodiments. When explanation is made with reference to FIG. 28(a), light beams L301, L302 emitted obliquely from the LED 14a are incident from the light incident portion 155 of the LED collimator, are reflected on its side surface 156 like slightly converged light, and reach the emission surface 157 of the LED collimator. Since an outer peripheral portion on the emission surface 157 of the LED collimator is particularly formed into a concave surface shape, the light beams L301, L302 are refracted and converted into substantially parallel light at this concave surface portion and are incident on a light incident portion 21w of the polarization conversion element. Adopting this configuration makes it possible to cause the light from the LED to be efficiently incident on the polarization conversion element even when a width of the light incident portion 21w of the polarization conversion element is narrow as shown in FIG. 28(a), so that a highly-efficient light source can be realized.

Subsequently, light beams emitted from the LED 14a and refracted by the light incident portion 155 of the LED collimator will be described with reference to FIG. 28(b). Since the light incident portion 155 of the LED collimator has a convex shape, the light beam L30 emitted from a center portion of the LED 14a is converted into substantially parallel light at the light incidence portion, passes through the polarization conversion element 21, and passes through the diffuser 18a, light guide 17, and diffuser 18b, and is incident on the liquid crystal display panel 52. Meanwhile, considering light beams L3001 and L3002 emitted from an end portion of the LED 14a and intersect with each other, particularly, at the center axis, their light beams are incident on the surface of the light incident portion 155 of the LED collimator at an angle close to perpendicular, and so its refractive angle is small. As a result, as shown in FIG. 28, the light beams are emitted in an oblique direction from the LED collimator 15, and results from being emitted also from the polarization conversion element in the oblique direction. Therefore, when no member for controlling each direction of the light beams exists between the polarization conversion element 21 and the light guide 17, the above light beams may deviate from the light incident portion of the light guide 17 like light beams L3001c and L3002c indicated by wavy lines, and so cannot be effectively utilized. Contrarily, since the present invention arranges an orientation (alignment) control plate 16c having a substantially cylindrical convex shape and located between the polarization conversion element 21 and the light guide 17, the light beams L3001 and L3002 are respectively refracted like the light beams L3001b and L3002b and are then incident on the liquid crystal display panel 52 via the diffuser 18a, light guide 17, and diffuser 18b, so that a highly-efficient light source can be realized. Particularly, this configuration is suitable for a case of using a comparatively larger LED than a width of the light incident portion of the polarization conversion element. Incidentally, this configuration is not limited to a configuration including the polarization conversion element 21, and the orientation control plate 16c may be disposed between the LED collimator 15 and the light guide 17. Further, the above configuration omits the diffusers 18a, 18b to be provided on the incident and emission surfaces of the light guide 17, and may also provide (form) the above-mentioned functional scattering surfaces (see FIGS. 13 to 16) onto their incident and emission surfaces instead of the omission.

Further, the light guide 17 disposed behind the composite diffusion block 16 is suitable for a downsized image display apparatus having a relatively small light-source emission surface. Particularly, however, the light guide 17 may be provided directly onto a polarization conversion element 21' instead of being disposed behind the composite diffusion block 16 as shown also in FIG. 29. Incidentally, as is apparent also from FIG. 29, this configuration is combined by a triangular-column translucent member 211' and a parallelogrammic-pillar translucent member 212' and reflects, at a boundary between them, the S-polarization wave (see the symbol (x) in FIG. 29) of the incident light that is emitted from the LED 14a and is to be parallel light. Meanwhile, the configuration forms the PBS film 211 transmitting the P-polarization wave (see upper and lower arrows in FIG. 29) and, simultaneously therewith, forms a half wave plate 213 on an upper surface of the parallelogrammic-pillar translucent member 212' and a reflection film 212 on its side surface.

As is apparent also from FIG. 29, by the above-mentioned configuration, a polarization component of the incident light, which is emitted from the LED 14a and is to be parallel light by the LED collimator 15, is polarized to S-polarization by the polarization conversion element 21' replacing the light guide 17, and the incident light leads to being emitted upward from an upper surface of the element. That is, the above-described configuration makes it possible to realize remarkably downsizing of the apparatus and a reduction in the manufacturing costs of the apparatus particularly by removing the light guide 17.

Further, FIG. 30 shows a configuration in which a plurality of sets of LEDs 14 and LED collimators 15 serving as light sources are arranged not only horizontally as described above but also vertically. That is, this embodiment arranges three sets of LEDs 14 and LED collimators 15 apart from each other in a lateral direction (see FIG. 30(a)) and, additionally thereto, arranges three sets of LEDs 14 and LED collimators 15 adjacent to each other also in a longitudinal direction (see FIG. 30(b)). Incidentally, the other configurations in the figure are the same as those in the second embodiment described above, and so their detailed descriptions will be omitted here for avoiding duplication.

Incidentally, such a configuration can arrange many LEDs 14 serving as light sources in number, and so makes it possible to realize a brighter image display apparatus. Also, the configuration can further enlarge the light emission surface, and so is suitable for a case of using an image display apparatus whose display area has a wide light emission surface or using a combination of such an image display apparatus and a liquid crystal display panel 52 whose display area is wide. Also, for example, such a configuration divides the light emission surface into a plurality of display areas corresponding to the plural LEDs 14 to independently control light emitting outputs (lighting) of the LEDs 14, thereby realizing so-called local diming and further making it possible to increase contrast of the displayed image and reduce power consumption. Also, such a multi-stage arrangement of the light sources is not limited only to the image display apparatus having a polarization function(s) of the second embodiment and, needless to say, almost the same effect can be obtained also by applying the multi-stage arrangement to the image display apparatus of the first embodiment.

In addition to the local dimming by controlling the individual LEDs described above, if the above-described control circuit (mounted on a flexible wiring substrate 53 in FIG. 3, for example) performs individual control of the LEDs and control of a combination of the LEDs and the liquid crystal display panel 52, performing such control also makes it possible to realize a more preferable image display apparatus with low power consumption and further realize a HUD apparatus using the same.

Incidentally, a longitudinal arrangement of the LEDs in the local diming is more preferably an alignment arrangement than a staggered arrangement. The control of illumination brightness for each place is easier to perform than that at the alignment arrangement. Also, even when the polarization conversion element is used, the longitudinal arrangement of the LEDs is more preferably the alignment arrangement. When the longitudinal arrangement is changed to the staggered arrangement, a polarization conversion prism needs to arrange separate elements depending on each longitudinal position while when the longitudinal arrangement is used, the prism has only to adjust a longitudinal thickness of a single element depending on the arrangement of the LED.

Further, the above description has been made about the liquid crystal display panel having excellent transmittance for the S-polarization wave. However, it is apparent to those skilled in the art that even when having excellent transmittance for the P polarization wave, the polarization conversion element having a configuration similar to the above can obtain the still similar action effect.

Incidentally, as is apparent also from the above detailed description, the modularized, downsized, highly-efficient display apparatus as described above makes it possible to miniaturize a volume of the entire HUD apparatus particularly when being configured so as to oppose on the optical axis of the concave mirror that reflects the image light to project it onto the windshield or combiner (however, a correction lens constituting a correction optical system is interposed therebetween). For this reason, the present embodiment can easily incorporate the HUD apparatus also into a narrow space called a dashboard, and exerts an excellent effect of further facilitating its incorporation and maintenance work.

In the above, described have been the image display apparatuses suitable for use in the HUD apparatuses according to the various embodiments of the present invention. However, the present invention is not limited only to the above-described embodiments, and includes various modifications examples. For examples, the above-mentioned embodiments have been detailed so as to make the present invention easily understood and explained, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION FOR REFERENCE NUMERALS

1 . . . HUD apparatus; 2 . . . Vehicle; 3 . . . Windshield; 5 . . . Driver; 30 . . . Image display apparatus; 41 . . . Concave mirror; 43 . . . Distortion correction lens; 55 . . . Exterior case; 54 . . . Antiglare plate; 11 . . . Light-source apparatus case; 12 . . . LED substrate; 13 . . . Heatsink; 50 . . . Liquid crystal display element; 51 . . . Liquid crystal display panel frame; 52 . . . liquid crystal display panel; 53 . . . FPC (Flexible wiring substrate); 14a, 14b . . . LED; 15 . . . LED collimator; 17 . . . Light guide; 18a, 18b . . . Diffuser; 172a . . . Reflection surface; 172b . . . Connection surface; 16 . . . Composite diffusion block; 161 . . . Texture; 21 . . . Polarization conversion element; 211 . . . PBS film; and 212 . . . Reflection film.

The invention claimed is:

1. An image display apparatus used in a head-up display apparatus, the head-up display apparatus projecting image light onto a windshield of a vehicle or a combiner provided just before the windshield to provide an image to a driver by a virtual image obtained from reflected light of the image light, the image display apparatus comprising at least:
   a solid light source;
   a collimator converting, into substantially parallel light, light emitted from the solid light source;
   a light guide, the light emitted from the collimating optical system being incident on the light guide, and the light guide emitting the incident light in a predetermined direction; and
   a liquid crystal display element provided on an emission surface of the light guide,
   wherein the light guide is configured to emit the incident light in a desired optical-axis direction different from an optical axis of the incident light, and to have a distribution about an intensity of light propagating emitted from the light guide,
   wherein the light guide includes:
      an incident portion, the light being incident on the incident portion;
      a reflection portion reflecting the incident light; and
      an emission portion emitting the light reflected by the reflection portion,
   wherein the reflection portion is composed of a plurality of reflection surfaces reflecting the incident light, and a plurality of connection surfaces each connected between the plurality of reflection surfaces, and
   wherein a ratio Lr/Lc between lengths Lr and Lc is different depending on the location, the length Lr being a length of a slope projected in a normal direction with respect to each emission direction of the reflection surfaces of the reflection portion, and the length Lc being a length of a slope projected in a normal direction with respect to each emission direction of the connection surfaces connected to the reflection surfaces.

2. The image display apparatus according to claim 1, wherein
   the incident portion has a structure of polarizing the light in such a direction as to increase an incident angle of the light incident on each of the reflection surfaces of the reflection portion.

3. The image display apparatus according to claim 2, further comprising a scattering body provided between the collimating optical system and the light guide,
   wherein the connection surfaces of the reflection portion is inclined with respect to the incident light by such an angle as to be shaded within a range of a half-value angle of the scattering body.

4. The image display apparatus according to claim 3, wherein an elevation angle of each of the reflection surfaces formed on the reflection portion of the light guide differs depending on a location, and
   a relative angle between the reflection and connection surfaces adjacent to each other is 90 degrees or more.

5. The image display apparatus according to claim 4, wherein the relative angle between the reflection and connection surfaces adjacent to each other is a constant value regardless of the location.

6. The image display apparatus according to claim 2, wherein a deflection structure of the incident surface of the light guide is a slope obliquely arranged with respect to the incident light.

7. The image display apparatus according to claim 6, wherein at least part of the obliquely arranged slope is a curved surface.

8. The image display apparatus according to claim 1, wherein the ratio Lr/Lc is minimized in vicinity of a center of the reflection portion.

9. The image display apparatus according to claim 1, wherein the image display apparatus has such a configuration as to partially reduce or block the light emitted from the light guide by partially reducing the ratio Lr/Lc.

10. The image display apparatus according to claim 1, wherein a sum of the lengths Lr+Lc is substantially constant.

11. The image display apparatus according to claim 1, wherein a sum of the lengths Lr+Lc is 0.6 mm or less and 0.2 mm or more.

* * * * *